(12) United States Patent
Robb et al.

(10) Patent No.: US 8,019,801 B1
(45) Date of Patent: Sep. 13, 2011

(54) TECHNIQUES TO RATE THE VALIDITY OF MULTIPLE METHODS TO PROCESS MULTI-DIMENSIONAL DATA

(75) Inventors: Richard A. Robb, Rochester, MN (US); Srinivasan Rajagopalan, Rochester, MN (US)

(73) Assignee: Mayo Foundation for Medical Education and Research, Rochester, MN (US)

( * ) Notice: Subject to any disclaimer, the term of this patent is extended or adjusted under 35 U.S.C. 154(b) by 237 days.

(21) Appl. No.: 11/165,597

(22) Filed: Jun. 23, 2005

Related U.S. Application Data

(60) Provisional application No. 60/582,140, filed on Jun. 23, 2004.

(51) Int. Cl.
G06F 12/00 (2006.01)
G06F 15/16 (2006.01)
G06F 17/30 (2006.01)
G06F 7/00 (2006.01)

(52) U.S. Cl. ...................................................... 707/899
(58) Field of Classification Search .................. 707/899, 707/736, 748
See application file for complete search history.

(56) References Cited

U.S. PATENT DOCUMENTS

| | | | | |
|---|---|---|---|---|
| 5,568,384 A * | 10/1996 | Robb et al. ...................... | 715/532 |
| 6,081,612 A * | 6/2000 | Gutkowicz-Krusin et al. ............... | 382/128 |
| 6,201,880 B1* | 3/2001 | Elbaum et al. ................. | 382/100 |
| 6,385,329 B1* | 5/2002 | Sharma et al. ................. | 382/100 |
| 6,556,695 B1* | 4/2003 | Packer et al. .................. | 382/128 |
| 6,584,216 B1* | 6/2003 | Nyul et al. ...................... | 382/131 |
| 6,611,618 B1* | 8/2003 | Peli ............................... | 382/154 |
| 6,715,145 B1 | 3/2004 | Bowman-Amuah | |
| 7,171,311 B2* | 1/2007 | Dai et al. ......................... | 702/19 |
| 2003/0128861 A1* | 7/2003 | Rhoads .......................... | 382/100 |
| 2004/0015775 A1* | 1/2004 | Simske et al. ................. | 715/500 |
| 2004/0040003 A1* | 2/2004 | Seligson et al. .................. | 716/4 |
| 2006/0050933 A1* | 3/2006 | Adam et al. ..................... | 382/118 |
| 2006/0240862 A1* | 10/2006 | Neven et al. ............... | 455/550.1 |

OTHER PUBLICATIONS

Peter Kovesi, Image Features From Phase congruency; 1999, The MIT Press, Videre: Journal of Computer Vision Research, vol. 1, No. 3, pp. 1-26.*
Iztok Koren et al. Interactive Wavelet Processing and Techniques Applied to Digital Mammography, 1996, IEEE, pp. 1415-1418.*
Alan V. Oppenheim, The Importance of Phase in Signals, 1981 IEEE, pp. 529-541.*
Peter Kovesi, "Image Features from Phase Congruency," 1999, Massachusetts Institute of Techonology.*
Bill Triggs, Detecting Keypoints with Stable Position, Orientation and Scale under Illumination Changes, 2004.*

(Continued)

*Primary Examiner* — Robert Timblin
*Assistant Examiner* — Hexing Liu
(74) *Attorney, Agent, or Firm* — Faegre & Benson LLP

(57) ABSTRACT

A system and method for rating the validity of multiple data processing algorithms $A_1$-$A_n$ on a set of multi-dimensional input data I where $P_1$-$P_n$ is the output data produced by the competing algorithms. Processing steps include: (1) computing the Fourier Transform or the phase congruence of the input data I, (2) computing the Fourier Transform or the phase congruence of the output data $P_1$-$P_n$, (3) computing the phase of the data computed at step 1, (4) computing the phases of the data computed at step 2, and (5) computing a similarity metric, such as the normalized cross correlation of each phase computed at step 4 with the corresponding phase computed at step 3. The similarity metrics computed at step 5 can be ordered to provide a ranking of the algorithm validity.

10 Claims, 27 Drawing Sheets

OTHER PUBLICATIONS

Sujan et al. "Fingerprint identification using space invariant transforms," Jun. 2001, Elseiver Science B.V. pp. 1-22.*
Oppenheim et al., "the Importance of Phase in Signals," IEEE, Apr. 14, 1980.*
Article, "A Methodology for Evaluating Image Segementation Algorithms," J.K. Udupa, Columbia University, New York, NY,, 2002, 12 pages.*
Article: "The Importance of Phase in Signals", Alan V. Oppenheim and Jae S. Lim, Proceedings of the IEEE, vol. 60, No. 5, May 1981, pp. 529-541.
Article: "On apparent counterexamples to phase dominance", R. P. Millane and W.H. Hsiao, J. Opt. Soc. Am. A/vol. 20, No. 4/Apr. 2003, pp. 753-756.
Article: "Valmet: A new validation tool for assessing and improving 3D object segmentation" Guido Gerig, Matthieu Jomier, Miranda Chakos, published in MICCAI 2001, 2208: 516-528.
Article: "A Methodology for Evaluating Image Segmentation Algorithms", J.K. Udupa et al., Columbia University, New York, NY., 17 pages.

* cited by examiner

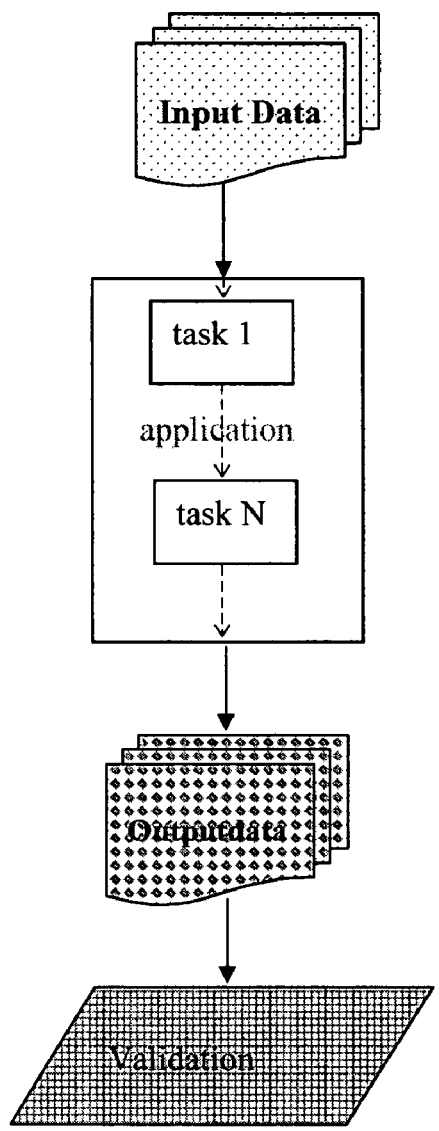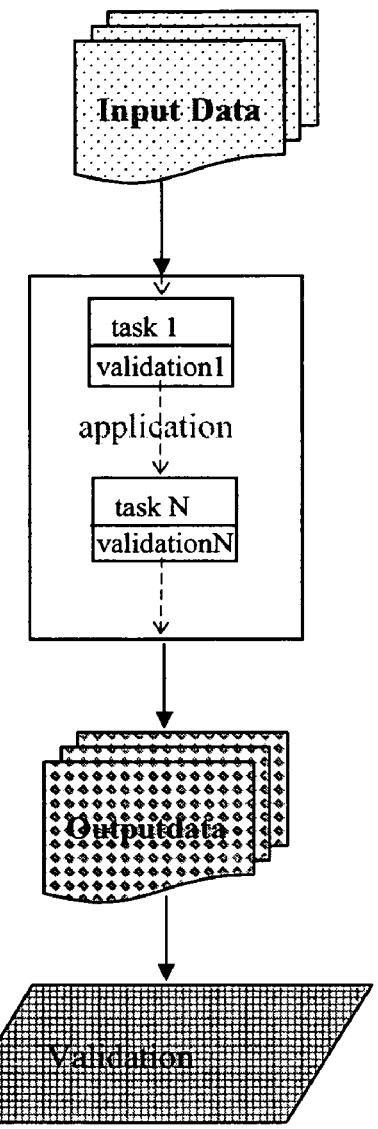
Fig. 1                    Fig. 2

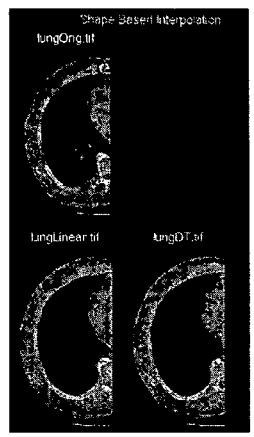
Fig 21
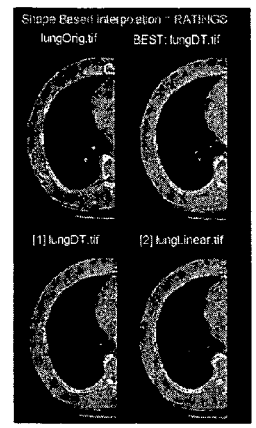
Fig 22
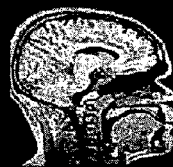 
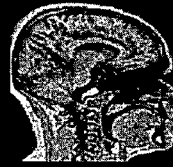 
 
Fig. 24
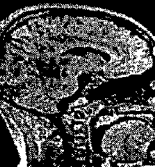 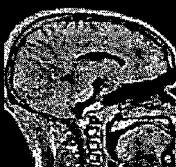
 
Fig. 23

TECHNIQUES TO RATE THE VALIDITY OF MULTIPLE METHODS TO PROCESS MULTI-DIMENSIONAL DATA

REFERENCE TO RELATED APPLICATION

This application claims the benefit of U.S. Provisional Application No. 60/582,140, filed Jun. 23, 2004, and entitled Techniques For Rating The Validity Of Multiple Methods For Processing Multiple Dimensional Data, which is hereby incorporated by reference in its entirety.

FIELD OF THE INVENTION

The invention is a system for rating the validity of different methods for processing data.

BACKGROUND OF THE INVENTION

"Data is Information is Knowledge is Wisdom." This truism was epitomized by Russel Ackoff in the year 1989. However, the data processing community has been tackling the intricacies associated with this pipeline for decades. Intellectual exercises have resulted in more than one ways of transitioning from one level (say data) to the other (say information). The levels are typically bridged using combinations of the likes of logical, mathematical, statistical, and other xxxxa1 tools typically referred to as algorithms, heuristics, cookbooks etc. (collectively algorithms hereafter). The level bridgers are referred to as tasks and the complete pipeline—an application. So an application is a collection of tasks each of which can be accomplished with multiple competing algorithms that have unique characteristic response to the ever-varying input data.

Depending upon the assumptions made about the levels and the intrinsic, extrinsic capability of the algorithm bridging the levels, the conclusion arrived at could be far from ideal. Hence it is essential to ascertain that the final conclusion arrived at is consistent with the given input data. This process is known as validation. This is done using a number of metrics, each of which typically involves comparing the result with a ground truth or surrogate truth. There are two main issues with this approach. Firstly, the metrics computed in the validation process is heavily dependent on the task to be accomplished. This makes the validation more algocentric instead of the preferred datacentric. Secondly, the ground truth holds good only for the given instance of the input data. As such if the ground truth is critical to the validation process, and it can be arrived at, irrespective of the difficulty in getting it, what is the need for exploring with a plethora of algorithms? Hence the present approach to validate applications seems to be in a quagmire.

Any new field typically undergoes a hype cycle and levels down finally to something that is useful and practical. That process ultimately converges on a recipe for mixing and matching the metrics to arrive at reasonable validation approaches. It is unlikely that such a final approach would be anything similar to the current practice.

FIG. 1 shows the current processing-validation (PV) pipeline. In this approach, the validation is done at the final stage after the data processing is completed. This is a necessary but insufficient step. Doing so ignores the fact that the application is a chain of tasks and that a chain is only as strong as the weakest link. This approach does not attempt to identify the weakest link. FIG. 2 shows a logical next-step approach.

In the refined PV pipeline, the individual tasks are validated. This helps to identify and address the weakest chain in the task link. This pipeline could be further refined by accommodating a number of independent ways (algorithms) to achieve the task. Even in the (debatable) absence of competing algorithms, there could be controllable parameter within the same algorithm that could respond differently to the input data.

By way of example, assume that an application has two tasks and for each task there are four competing algorithms. The corresponding PV pipeline is given in FIG. 3. If $A_i$ is the number of algorithms supported at each task, the number of input paths to the validation step is $$\prod_{i=1}^{\#tasks} A_i$$

Just for a two stage, 4 algos/stage application, this would be 16. Hence it is practically infeasible to implement such a pipeline. Using a scheme similar to that in FIG. 2, the number of validations to be performed would be the sum of the number of algorithms supported in each stage. Such a pipeline is shown in FIG. 4.

The interleaved PV pipeline shown in FIG. 4 makes logical sense since no serious application builder will restrict an application to be driven by a single algorithm for each critical task. Moreover, each algorithm responds uniquely to the input data. So an approach to validate the results at the individual task level across multiple competing algorithms allows the data to be processed by the best algorithm suited for it.

Though this might seem logically sound, it is not practically feasible due to the following bottlenecks:

1. For the PV pipeline to support assembly line deployment, the validation task should be fully automatic. Unfortunately, there hardly seems to be any single scheme that provides this for any task.
2. Applications are often built by cascading off-the-shelf APIs (application programmer's interface). The validation approach and the metrics to be calculated therein vary depending on the task being performed. So the application builder is burdened with the job of writing validation functions for each task.
3. Even if the application programmer stubs the validation functions, as mentioned before, majority of the prevailing metrics involve using ground truth which is almost impossible to obtain at the individual task level.
4. Validation has to be performed "live". Unfortunately, existing validation methodologies take more time, interaction and tweaking at run time than, at times, the original task level algorithms. Even if multiple algorithm execution is feasible for each task, overheads caused by validation could be prohibitively expensive.
5. Existing validation strategies are time consuming, since they typically involve computing sufficient number of metrics and suitably weighting them. Finding the right weights is more of an art than science. Moreover, at the task validation level shown in FIG. 5, a simple "yes" or "no" answer is needed to the question "Given the input data, is algorithm x.y better than x.Y for this application?" Unfortunately, current metrics do not support such a simple answer.

Hence there is a need for a task validation approach that is robust, fully automatic, fast, scaleable, simple, data and task independent and is not dependent on the availability of ground or surrogate truth.

SUMMARY OF THE INVENTION

The invention disclosed here meets all the requirements mentioned above. In addition:
1. The proposed mechanism scales gracefully with dimensions, number of methods to rate, crisp or fuzzy logic based methods, scalar and/or vector data input and/or output, real and/or complex valued data input and/or output.
2. The processed data could either be a result of the enhancement or abstraction of the input data.
3. Being a basic invention, it can be used in diverse data mining applications including, but not limited to, multidimensional Imaging, Image processing, image computing, signal processing, data processing, smart devices etc.

BRIEF DESCRIPTION OF THE DRAWINGS

FIG. 1 is a schematic illustration of a processing validation pipeline that treats the whole application as a black box and validates just the final output.

FIG. 2 is a schematic illustration of a second processing validation pipeline where individual tasks are validated to identify the weakest chain in the link.

FIG. 21 is an illustration of test images used in connection with Example 8.

FIG. 22 is an illustration of images rated in accordance with the present invention in Example 8.

FIG. 23 is an illustration of test images used in connection with Example 9.

FIG. 24 is an illustration of images rated in accordance with the present invention in Example 9.

DETAILED DESCRIPTION OF THE INVENTION

Figure 3:
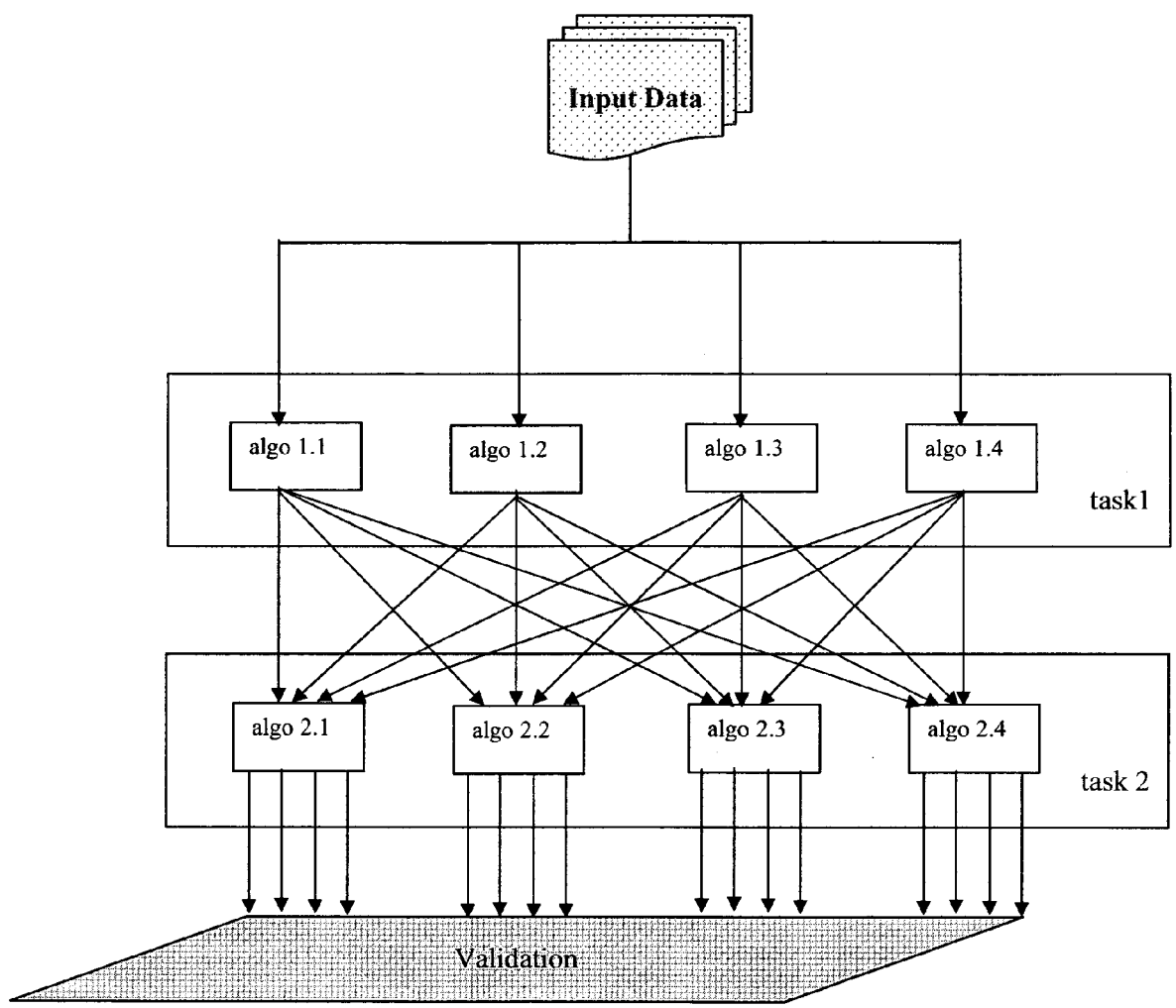
FIG. 3 is a schematic illustration of a processing validation pipeline supporting multiple algorithms for all tasks.

Observation 1:

Given an input data I and an unordered list P: $\{P_1, P_2, P_3, \ldots P_n\}$ of data produced by n competing algorithms A: $\{A_1, A_2, A_3, \ldots A_n\}$ such that $A_i(I)=P_i$, the result $P_x$ (and consequently the algorithm $A_x$) that best represents the input data I is one which has the maximum/minimum normalized cross correlation (NCC) of the phase representations of I and $P_i$. Ordering the NCC of the phase representations of I and $P_i$ orders P.

Observation 2:

Given an input data I and an unordered list P: $\{P_1, P_2, P_3, \ldots P_n\}$ of data produced by n competing algorithms A: $\{A_1, A_2, A_3, \ldots A_n\}$ such that $A_i(I)=P_i$, the result $P_x$ (and consequently the algorithm $A_x$) that best represents the input data I is one which has the maximum/minimum normalized cross correlation (NCC) of the phase congruence representation of I and $P_i$. Ordering the NCC of the phase representations of I and $P_i$ orders P.

If the processed data is expected to be closer to the original, then the ordering of NCC is preferably done in ascending order. If the result is expected to be away from the original, then the ordering of NCC can be done in descending order. By using phase representations of I and $P_i$ operations are done in the Fourier domain. In the Phase congruence representations we operate in the Wavelet domain. While the ordering is guaranteed to be consistent in both the domains, Fourier space is preferred due to faster execution time.

Validation Steps

1. Compute the n Dimensional fft or phase congruence of the input data I.
2. Compute the n Dimensional fft or phase congruence of each of the processed data in P.
3. Compute the phase of (1).
4. Compute the phase of (2).
5. Compute the NCC of each of the entries in (4) with that obtained in step (3).
6. Order the NCCs obtained from (5) according to the user specified sorting flag. As noted later, the flag can be specified by the user and can be done easily. The order gives the rating of the results vis-à-vis the input data I.

The above description of the invention avoided casting the nature of input or processed data. This was done primarily to avoid misrepresenting the boundaries of the invention. However, such generalities are hard to follow when explaining the underlying mathemagics. Hence from now on, we will assume only for purposes of example, and without loss of generality, that the input (and hence processed) data could either be a one dimensional signal, two dimensional image or a three dimensional volume. However, this description still does not define the task (apart from saying that it could be either an enhancer or abstractor) being validated. A strength of this invention is exactly that: the validator is blind regarding the task. All it knows and needs to know is the input data, processed data and a flag to indicate ascending or descending order to follow in the rating.

The normalized cross correlation calculation provides a similarity metric. Other embodiments of the invention make use of alternative calculating methodologies to provide this function in equivalent manners. By way of non-limiting examples, the similarity measure can be provided by calculating the Mean Absolute Phase Difference (MAPD), Normalized Man Square Error (NMSE), Scale Invariant Normalized Mean Square Error (SINMSE).

Fourier Transform of an Image

The Fourier Transform is an important tool that is used to decompose an nDimensional data into its sine and cosine components. The output of the transformation represents the nD data in the Fourier or frequency domain, while the input data is in the spatial domain. In the Fourier domain data, each point represents a particular frequency contained in the spatial domain data. Discrete Fourier Transforms (DFT) is used to compute Fourier transforms of digital nD data.

For a square image of size N×N, the two-dimensional DFT is given by:

$$F(k, l) = \frac{1}{N^2} \sum_{i=0}^{N-1} \sum_{j=0}^{N-1} f(i, j) e^{-i 2\pi \left(\frac{k_i + l_j}{N}\right)}$$

where $f(i,j)$ is the image in the spatial domain and the exponential term is the basis function corresponding to each point F(k,l) in the Fourier space. The equation can be interpreted as: "the value of each point F(k,l) is obtained by multiplying the spatial image with the corresponding base function and summing the result".

The DFT of an image is complex with a real and an imaginary part. If F(k,l) is the value of a pixel of the FT, we have F(k,l)=R(k,l)+i I(k,l) where R(k,l) is the real part and I(k,l) the imaginary part. The magnitude of the image is defined as:

$$M(k,l) = \sqrt{R^2(k,l) + I^2(k,l)}$$

and the phase of the image as:

$$\phi(k, l) = \tan^{-1}\left(\left|\frac{I(k, l)}{R(k, l)}\right|\right)$$

Figure 5:
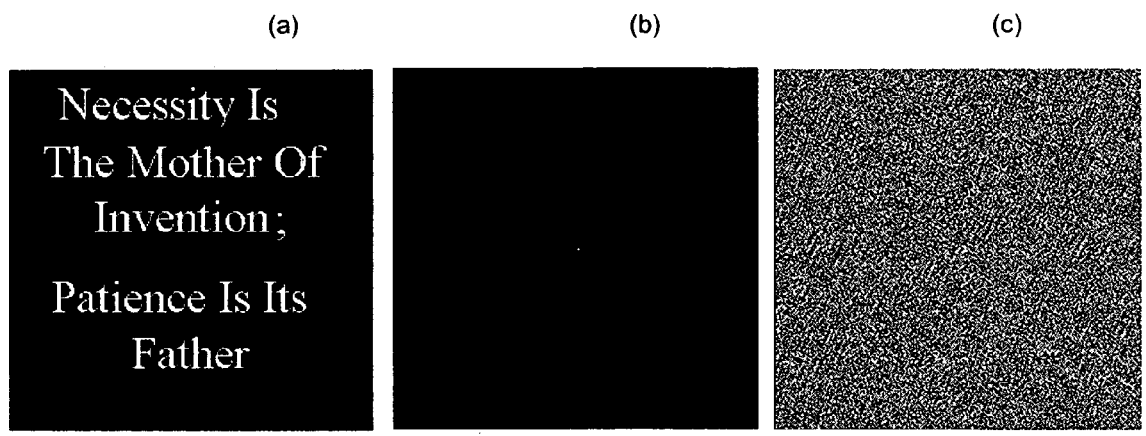
FIG. 5 is an illustration of the magnitude and phase components of the Fourier domain representation of an image, with (a) showing the original image, (b) the magnitude image and (c) the phase image.

FIG. 5 shows the magnitude and phase components of the Fourier domain representation of an image. FIG. 5(*a*) is the original image, 5(*b*) the magnitude image, and 5(*c*) the phase image.

Since the phase image looks intelligible, data processing and data acquisition community has ignored the need to preserve the phase components in the original acquisition or subsequent reconstruction. However, the spectral magnitude and phase tend to play different roles and in some situations, many important features of the data are preserved if only the phase is retained. This is due to the fact that while a data's magnitude spectrum contains the relative weights between frequency components, the phase spectrum localizes these frequency components in space. In spite of the significance of the phase dominance syllogism, a rigorous mathematical proof still remains elusive. Phase dominance is usually proved by examples and we will use the same approach.

Figure 6:
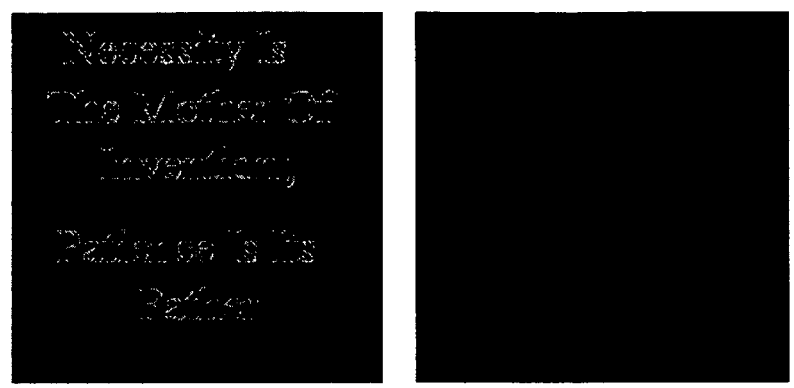
FIG. 6 illustrates a reconstruction of the Fourier transform of the image shown in FIG. 5a, with (a) showing the retained magnitude and (b) the phase.

FIG. 6 shows the reconstruction of the Fourier transform of the image in FIG. 5*a* by retaining only the magnitude (6*a*) and phase (6*b*).

From FIG. 6, it is clear that phase-only reconstruction preserves much of the correlation between the signals suggesting that the "location" of events is preserved. It can also be seen that much of the intelligibility between the reconstructed phase-only image (6*a*) and the original image (5*a*) is related to the location of "events" or "features" such as lines, points etc.

Example 1

DeNoising One Dimensional Signal

The removal of noise from noisy data to obtain the unknown signal is referred to as denoising. This is a de facto preprocessing task applied on any 1 dimensional signal, 2D image or nD data. A number of methods are available to filter the noise. In general, Wavelet based methods have been found to yield good results. However, the different basis functions available in wavelet domain, the parameters associated with the different wavelet denoisers and the lack of tools to inspect the result in the wavelet domain has made the data-algorithm matching difficult to accomplish.

Figure 7:
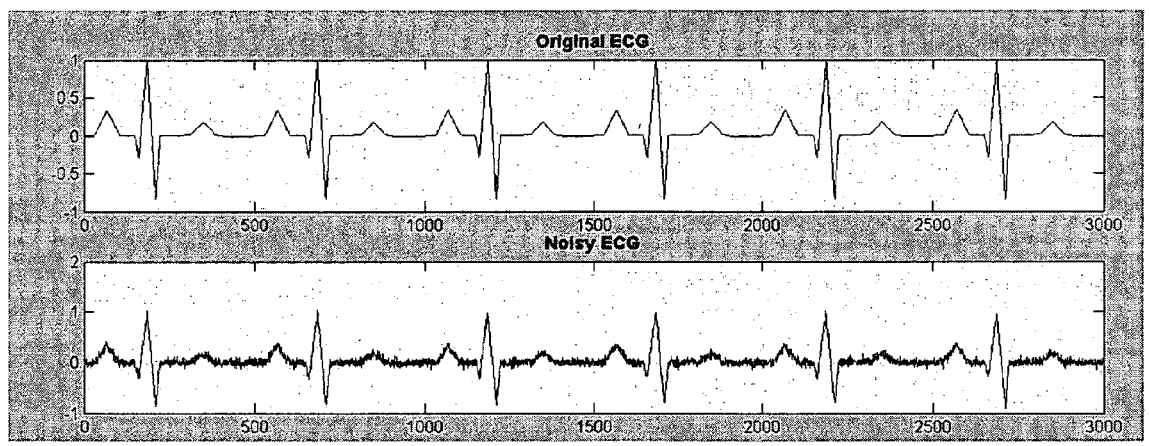
FIG. 7 is an illustration of original and noisy ECG test signals used in connection with Example 1.
Figure 8:
FIGS. 8a-8d are illustrations of processed ECG signals used in connection with Example 1.

The Matlab wavelet toolbox demo on denoising was used. The signal was synthetically generated to mimic an ideal ECG (FIG. 7a). Additive random noise was added to this signal (FIG. 7b). Matlab function 'wden' that automatically denoises 1D signals was used to denoise. Algorithms using the principle of Stein's Unbiased Risk (rigrsure), heuristic version of Stein (heursure), universal thresholding techniques (sqtwolog) and the minimax thresholding (minimax) were used to produce four different results (FIGS. 8a-8d). The original and the noise added signals were treated as input data in turn (In practice, original signals are hard to obtain. Since synthetic data was used, it was decided to test out the validator both for the noise corrupted and the original signal). In each case the four signals produced by the competing algorithms were used as the processed data.

Normalized Mean Square Error (NMSE) between the original signal and each of the processed data is used to estimate the level of noise reduction.

$$NMSE(I, P_i) = \frac{\text{Variance}(I - P_i)}{\text{Variance}(I)}$$

A small NMSE suggests that the processed data is very close to the original data. This is a global measure and is not sensitive to local changes in the signal. Hence it is clear that when data with different types of degradation (or gradation) are compared, the one with the smallest NMSE will not necessarily seem closest to the original. If NMSE calculations are misleading, then ratios like SNR improvements are not relevant.

Table 1 gives the orderings of the results produced by the four methods using the NMSE measures and the PNCC measure. The numbers in the first two rows represent the ranking assigned by the NMSE and PNCC measure for that particular algorithm. Algorithms were rated against both the original and noisy signal. For both the cases, the "descending order" was used to order both the measures. Intuitively, same order does not make sense when rating against both the original and noisy data since the process is signal enhancement and hence one would be compelled to use "ascending order" for rating against noisy data and "descending order" for rating against original data. However, note from FIG. 7, that the additive noise has very much kept the signal's trend same as that of the original and so the rater should have the same directional ordering.

results. However, just from visual inspection it is clear that while minimaxi was globally better than heursure as reported by NMSE, locally heursure is more in line with both the original and noise input data. The PNCC measure has captured the local variations much better than the existing objective NMSE measure.

Example 2

MR Image Acquisition

The first body MRI image acquisition performed by "indomitable" on Jul. 2, 1977 took four hours and forty-five minutes. In 2001, a similar whole body MR imaging could be accomplished in thirty seconds. Parallel computing, Parallel hardwires (coils) and better understanding and exploitation of the Fourier space have made this quantum leap possible. Sensitivity encoding (SENSE), Pruessmann K. P. et al. "SENSE: Sensitivity encoding for fast MRI" *Magm. Reson Med,* 1999; 42:952-962, is a good for this. In SENSE, multiple receiver coils are used and each receiver coil receives a different signal voltage from the imaged object based on the position of the receiver coil relative to the object. Computational algorithms can use these differences in signal voltage to subtract the aliasing effect and create a whole image. The result of SENSE is the acquisition of a unaliased image with only half the k-space data, and therefore, half the time. The disadvantage is the decrease in SNR due to fewer k-space data points. Hence there is a need to quantify the image quality based on the number of parallel coils used.

Figure 4:
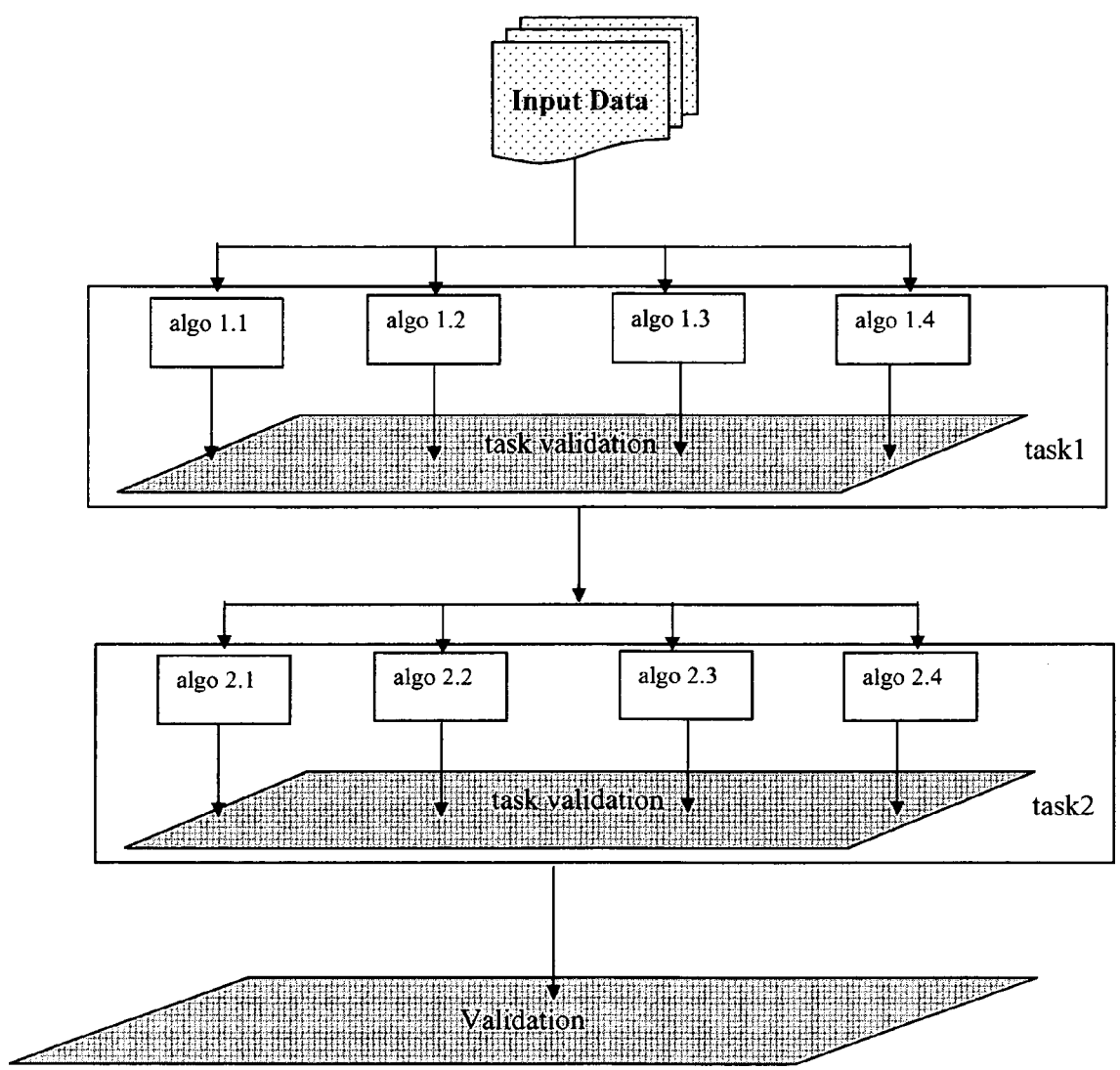
FIG. 4 is a schematic illustration of a processing validation pipeline supporting multiple algorithms for each task and validations at task level.
Figure 9:
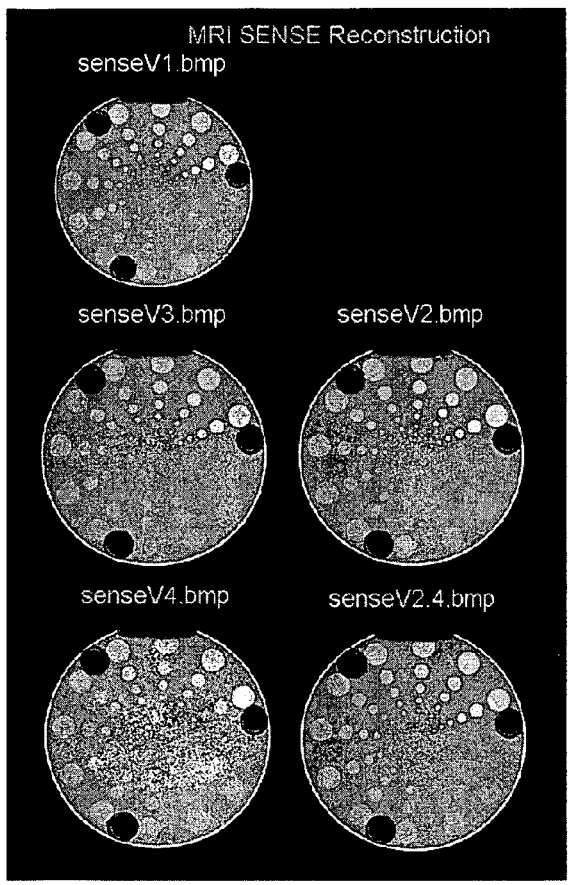
FIG. 9 is an illustration of test images used in connection with Example 2.

To evaluate the invention, the images (2nd column of FIG. 4) reported in http://www.mr.ethz.ch/sense/sensereductionzoom.html were used. The vertical phase encode image was cropped with Reduction Factor 1.0 ($1^{st}$ row) and treated as the Original image (FIG. 9a). The vertical phase encode images with reduction factors 2.0, 2.4, 3.0 and 4.0 were used as competing results (FIG. 9b-e) and the rating order was set to "descending" since we need to find the result which has maximum correlation with the original image.

In the Pruessmann article referred to above, the authors have provided only qualitative descriptions of the results. No quantitative measures were considered to rate the results. However, just from visual inspection it is clear that the SENSE reconstruction quality decreases with increase in reduction factor. Hence the result produced at R=2.0 is closer to that of the original. In general, the MR community has been using measures like SNR, NMSE, difference images etc., to report the quality of image acquisition. Considering that MR signal intensity is not in a standardized scale, such measures might not be reliable.

TABLE 1

|  | heursure | | Rigrsure | | sqtwolog | | minimaxi | |
| --- | --- | --- | --- | --- | --- | --- | --- | --- |
|  | NMSE | PNCC | NMSE | PNCC | NMSE | PNCC | NMSE | PNCC |
| Original | 4 | 3 | 2 | 1 | 1 | 1 | 3 | 4 |
| Noisy | 4 | 3 | 2 | 2 | 1 | 1 | 3 | 4 |
| Computation Time (secs) | NMSE | | 0.051 | | | | | |
|  | PNCC | | 0.050 | | | | | |

Figure 10:
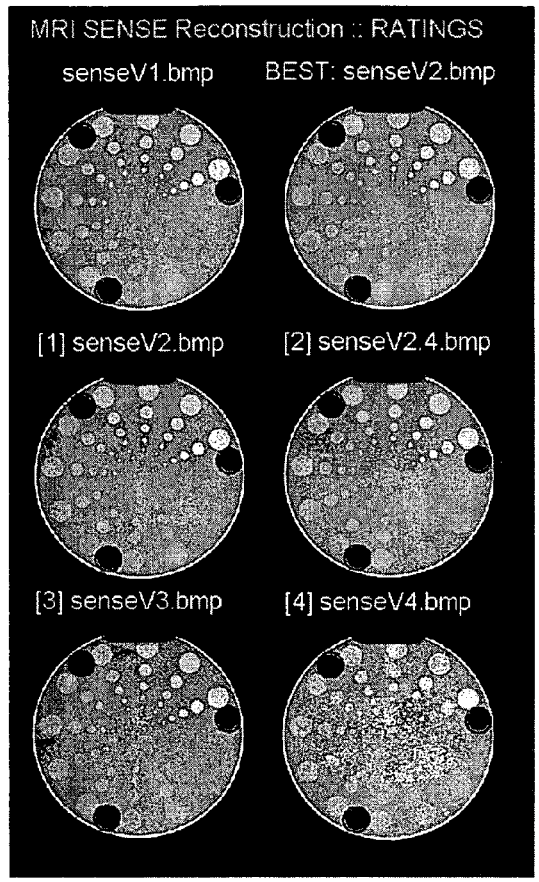
FIG. 10 is an illustration of images rated in accordance with the present invention in Example 2.

Both the methods gave consistent ratings wrt original and noisy input data as expected. Both the methods take approximately the same computation time. There was a discrepancy between the two measures in rating heursure and minimaxi FIG. 10 shows the orderings produced by PNCC measure of the invention. This is consistent with the author's observations reported above. The computation time for this measure was 0.609 seconds. We also found that the authors' statement on page 957 of the Pruessmann article, "Obviously, in terms of geometry the vertical phase encoding is the superior choice for the given arrangement of coils and imaged slice" to be true using the PNCC measure.

Example 3

Projection Reconstruction Techniques

The method most universally used at present to invert and solve the classical "projection formula" to reconstruct CT, PET, SPECT and sometimes Ultrasound and MRI is either the Fourier transform method or the convolution or the filtered back projection (FBP) method. FBP is an extension of the simple back projection technique. Extensions include prefiltering to correct the blurring problem and an interpolation scheme for sampling on the grid. There are a number of options to perform the filtering and the interpolation. Depending on the choice made, the results can be different. Hence there is a need to rate and order different results.

Figure 11:
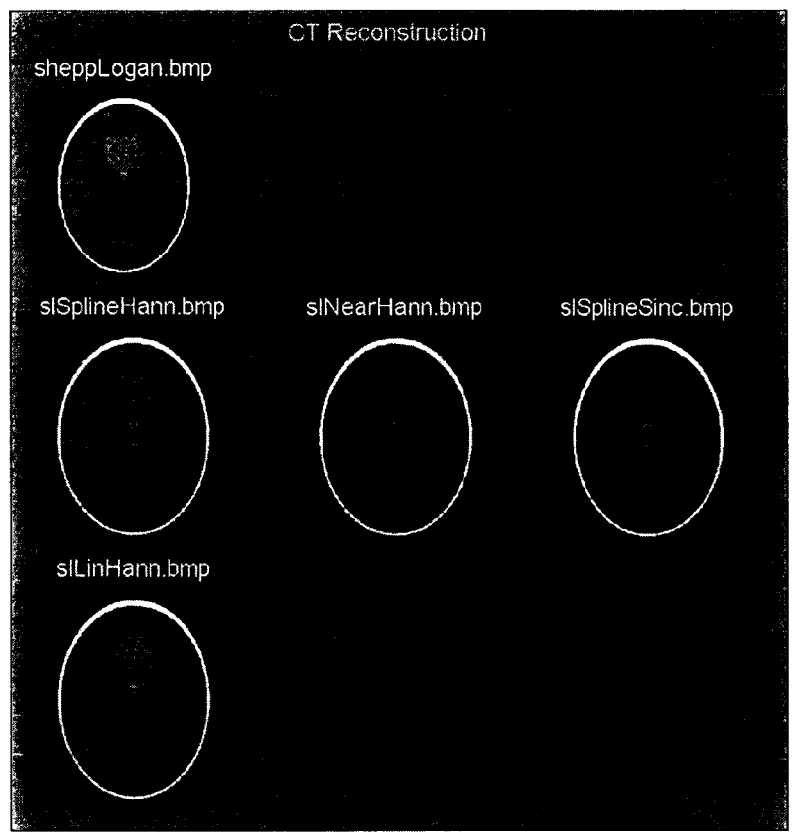
FIG. 11 is an illustration of test images used in connection with Example 3.

The Matlab radon and iradon functions to reconstruct the commonly used Shepp-Logan phantom, Peter Toft, "The Radon Transform—Theory and Implementation" *PhD. Thesis*, Dept. of Mathematical Modelling, Technical University of Denmark, June 1996. Matlab function phantom was used to create the input data (FIG. 11*a*). Radon transform was computed for this image using radon through 180 degrees. The resulting image was back transformed using iradon to create the produced data. This function supports nearest, linear, and spline interpolation and ramlak, hamming, sinc and hann filters. Following combinations were used to produce four different competing results: spline+hann; nearest+hann; spline+sinc; linear+hann (FIG. 11*b-e*). The sort flag was set to "descending".

Difference images are generated to visually inspect the results. Hence it is not automatic. However, from a fundamental understanding of the filters and interpolation theory it is clear that among filters sinc filters provide the best result and, among the interpolation schemes spline interpolants perform the best.

Figure 12:
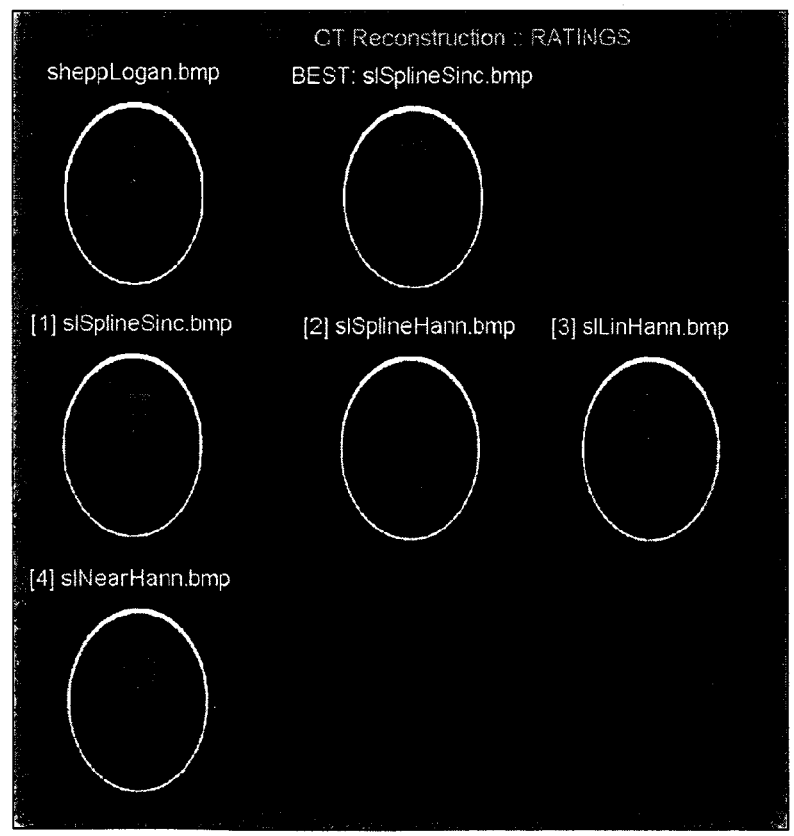
FIG. 12 is an illustration of images rated in accordance with the present invention in Example 3.

FIG. 12 shows the ratings from the PNCC measure. As expected, the spline-sinc combinations produced the best result. The nearest-hann combination performed the worst (as expected). The computation time for this task was 0.594 seconds.

Example 4

Restoration—Blind Deconvolution

All imaging systems have imperfections. This is due to fundamental physical limitations of the imaging components used in the system that often cascade in sequence to contribute to image degradation. The result is that images are never perfectly sharp or precise in representing the object that was imaged. Generally, the highest frequencies or sharpest details are degraded or lost. If an infinitely sharp point source is imaged, it will appear blurred, with the shape and size of the blur depending on the performance of the imaging system. The shape or size of the blur is referred to as point spread function or psf. If it is possible to measure, estimate or guestimate the psf, then one could deconvolve the image with the psf to restore the high frequency components. This process is known as image restoration or image deconvolution. Blind deconvolution techniques perform deconvolution without any apriori knowledge. They typically predict and correct the psf iteratively. Different flavors of blind deconvolution exist and they respond differently to different images. Hence there is a need to rate their performance for the given input data.

Figure 13:
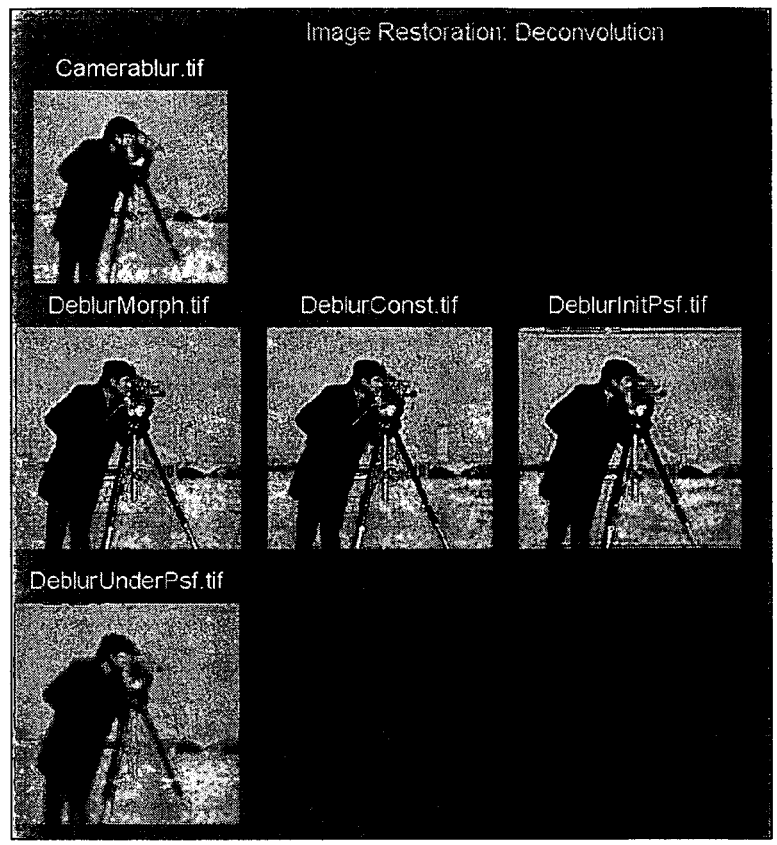
FIG. 13 is an illustration of test images used in connection with Example 4.

Matlab blind deblurring demo was used to test the rater. FIG. 13*a* shows the motion-blurred version of the cameraman image. FIG. 13*b-e* shows the four competing results produced by the different algorithms shown in the demo. The sorting flag was set to "descending" since we are performing an enhancement and so expect the results to be away from the input deblurred data.

Figure 14:
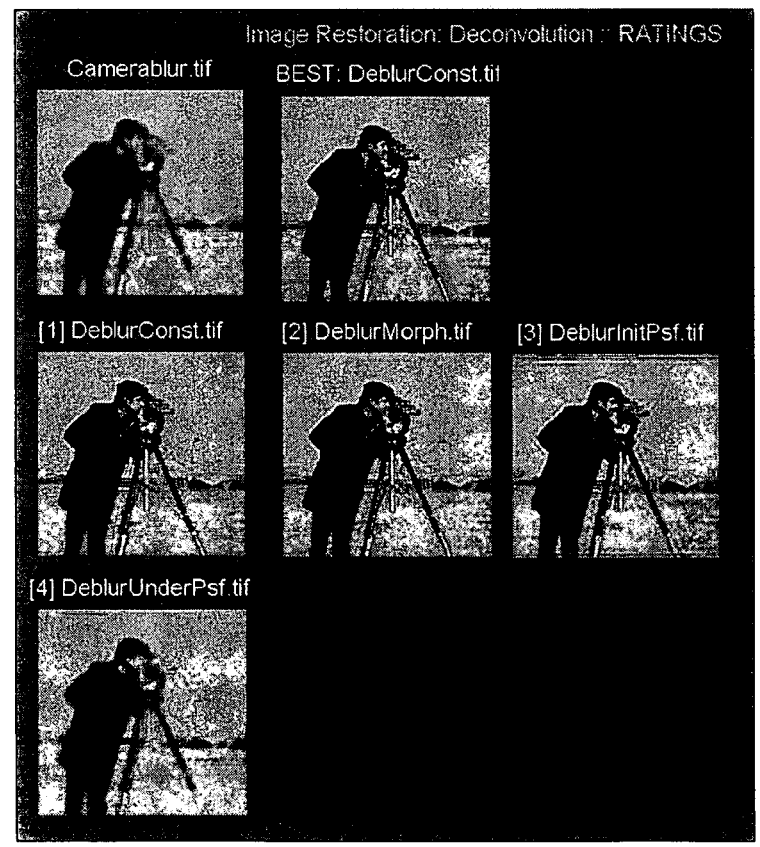
FIG. 14 is an illustration of images rated in accordance with the present invention in Example 4.

Current metrics are basically based on visual inspection. While this could be reliable, it cannot be used in an application that requires the least manual inspection. FIG. 14 shows the ratings produced by this measure. The computation time for this was 0.593 seconds. The results agree with those claimed in the Matlab demo.

Example 5

Image Contrast Enhancement

The term "contrast" is used in many different ways in diagnostic imaging. The ability of the imaging system to detect differences in signal intensity between two structures is called the contrast resolution. A higher contrast resolution implies better and clearer visual and computational delineation of structures. Contrast improvement algorithms are used to improve the quality of images.

Figure 15:
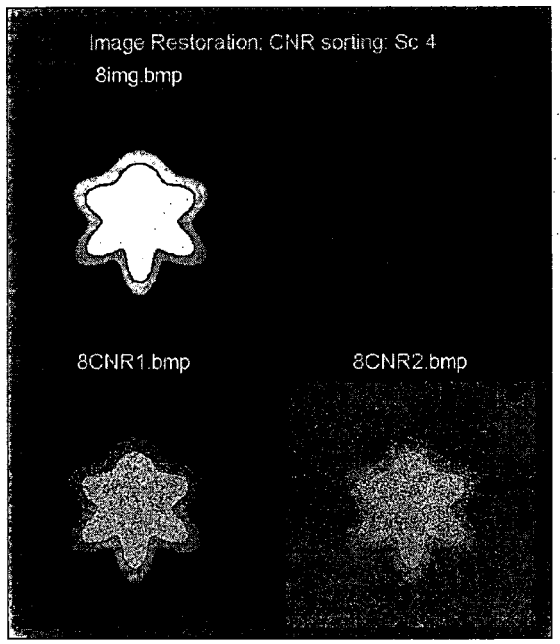
FIG. 15 is an illustration of test images used in connection with Example 5.

Synthetic data (FIG. 15*a*) with high contrast regions was used as the input data. Noise addition and contrast reduction at two different levels were used to create competing results (FIG. 5*b-c*). The ordering flag was set to "descending".

Figure 16:
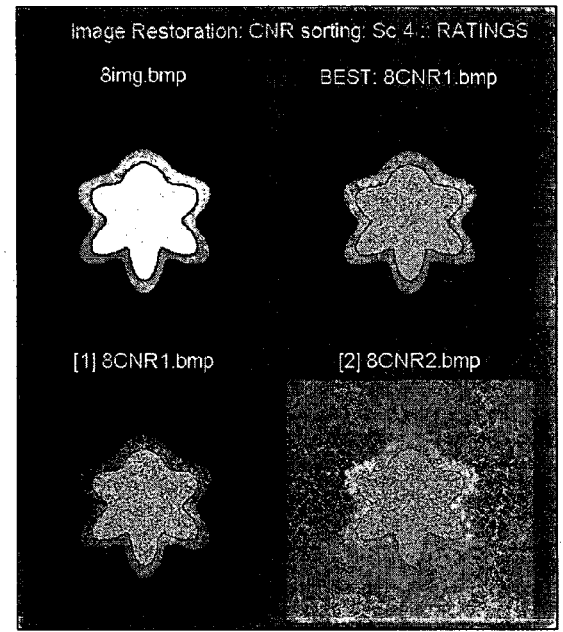
FIG. 16 is an illustration of images rated in accordance with the present invention in Example 5.

Current rating is based predominantly on visual inspection. FIG. 16 shows the PNCC ratings, which is consistent with expected result. Computation time was 0.328 seconds.

Example 6

Image Smoothing

Image smoothing operators exploit redundancy in the image data to suppress image noise. Generally, it involves finding a new value for each pixel based on the averaging of brightness values in some neighborhood. Smoothing poses the problem of blurring sharp edges in the image, so there is a need to use edge-preserving approaches.

Figure 17:
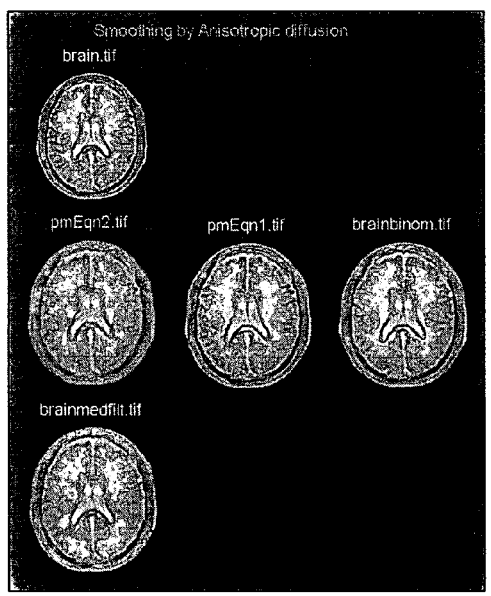
FIG. 17 is an illustration of test images used in connection with Example 6.

MR brain image (FIG. 17*a*) was used as the input data. This image was filtered using a 5×5 median filter, 5×5 binomial filter and the classical non-linear anisotropic diffusion, P. Perona, J. Malik. "Scale-space and edge detection using anisotropic diffusion". *IEEE Trans. on Pattern Anal. and Machine Intelligence*, 12(7):629-639, July 1990. For anisotropic diffusion filtering was done using both the equation which favors high contrast edges over low contrast ones and the second equation which favors wide regions over smaller ones. The filtered images (FIG. 17*b-e*) were treated as competing results. Ordering flag was set to "ascending" to rate results in terms of highest smoothing.

Figure 18:
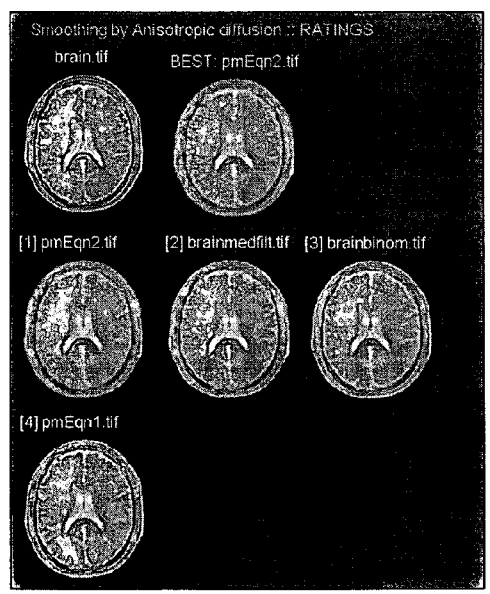
FIG. 18 is an illustration of images rated in accordance with the present invention in Example 6.
Figure 19:
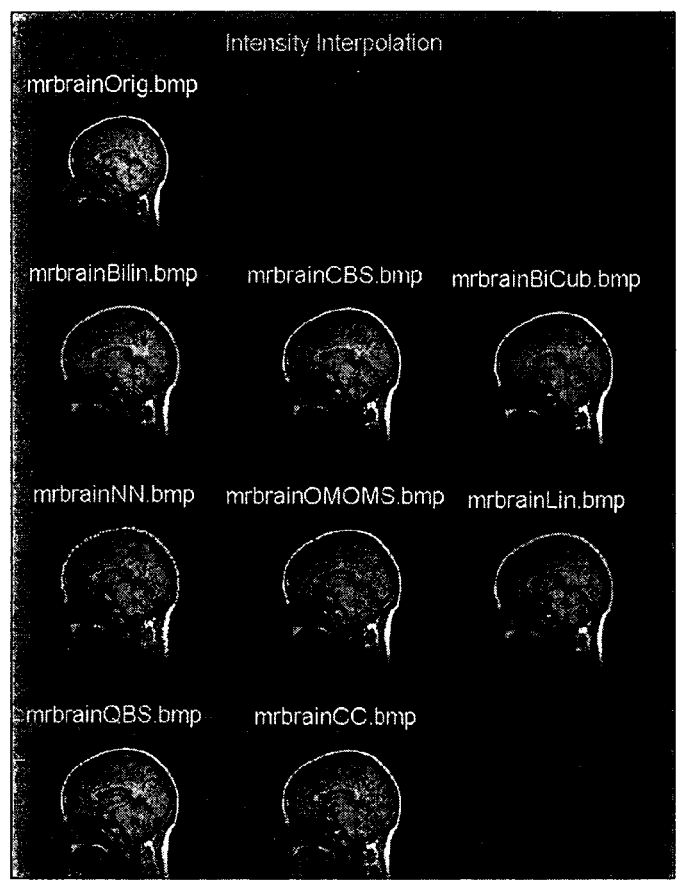
FIG. 19 is an illustration of test images used in connection with Example 7.

Current rating is based predominantly on visual inspection. FIG. 18 shows the PNCC ratings which are consistent with expected result. Computation time was 0.188 seconds.

Example 7

Intensity Interpolation

Interpolation of sampled data is central to many digital image-processing operations such as sub pixel translation, rotation, elastic deformation, magnification etc. It is important to limit the grey-value errors introduced by interpolation.

A sagittal section of a MR brain image (FIG. 19a) as the input data. This data was successively rotated through 0.7, 3.2, 6.5, 9.3, 12.1, 15.2, 18.4, 21.3, 23.7, 26.6, 29.8, 32.9, 35.7, 38.5, 41.8 and 44.3 degrees, Meijering E. H. W et al. "Quantitative evaluation of convolution-based methods for medical image interpolation", Medical Image Analysis, 5:111-126, 2001, to cumulatively add up to 360 degrees so that the final image is in the same orientation as the input data. This round trip was repeated on different interpolants to produce the competing results (FIG. 19b-i). The interpolants used were nearest, linear, bilinear, bicubic, cubic convolution, cubic bsplines, OMOMS and quintic b-splines. Ordering flag was set to "descending".

In the Meijering article mentioned above, the authors used the average, normalized root-mean-square errors introduced by each of the interpolants on a number of different images to report the ratings. This does not give a true rating of the interpolant with respect to a given input data. However in the article http://imagescience.bigr.nl/meijering/software/transformj/affine.html, it is reported that the quality of the interpolations, in general, increase in the following order: nearest, linear, cubic convolution, OMOMS and quintic b-spline.

Figure 20:
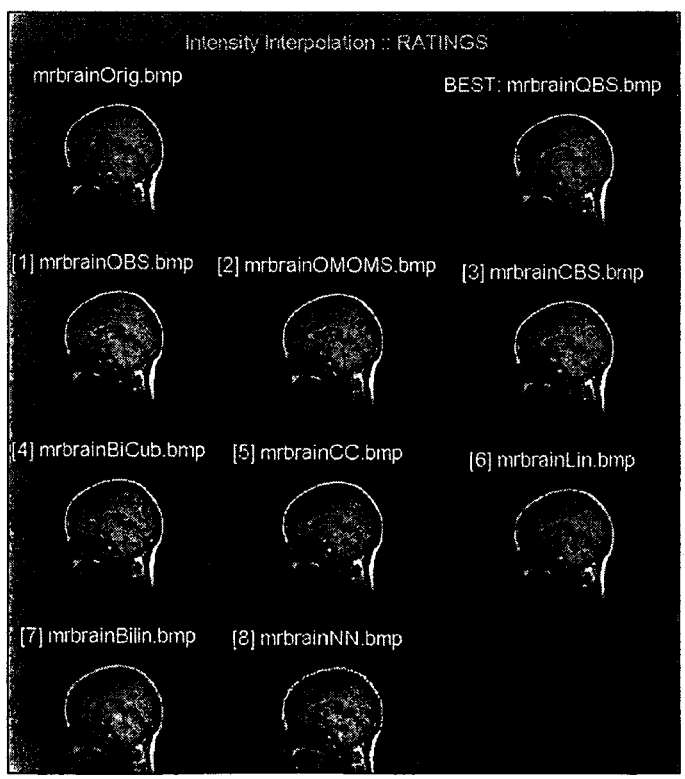
FIG. 20 is an illustration of images rated in accordance with the present invention in Example 7.

FIG. 20 shows the ratings using the PNCC measure. Computation time was 0.859 seconds. The ratings are consistent with prior knowledge.

Example 8

Shape Based Interpolation

Technological, clinical and logistical limitations prevent isotropic acquisition of 3-D biomedical volume images. Usually, the slice thickness will be significantly greater than the in-plane pixel size. To facilitate the processing and visualization of such anisotropic acquisitions, a number of interpolation techniques have been proposed. These techniques can be broadly classified into grey-level and shape-based techniques. Example 7 involved the evaluation of a grey-level technique. Shape-based techniques exploit the shape of the object to be interpolated and provide a seamless tweening between the frames.

The results from a paper which compared the intensity interpolation with the shape-based interpolation were used. The input lung image data is shown in FIG. 21a. Slices adjacent to this input data was used to interpolate the competing slices using intensity and shape-based interpolation. (FIG. 21b,c). These competing slices were rated against the input data by setting the ordering flag to "descending".

It is well established that shape-based interpolation outperforms the intensity-based interpolation for both inter and intra slice interpolations. FIG. 22 shows the ratings of PNCC. Computation time was 0.094 seconds.

Example 9

Inhomogeneity Correction

MR image data is often radiometrically inhomogeneous due to RF field deficiencies. This variability of tissue intensity values with respect to image location severely affects visual evaluation and also further processing based on absolute pixel intensities. A number of methods are available to retrospectively correct the inhomogeneity.

The input data used for this example is shown in FIG. 23a. An algorithm using legendre-polynomial based bias-field fitting and the inhomogeneity correction supported within Analyze was used to generate the competing results (FIG. 23b-e). The ordering flag was set to "ascending".

A comprehensive comparison of inhomogeneity correction algorithms is reported in the article http://neurovia.umn.edu/papers/tech reports/bias correction.html. Therein the authors simulated inhomogeneity on a good MRI brain data and corrected it using different algorithms. Comparison was made by (a) computing and comparing volumes of white, and grey matter on the original data and the bias corrected data and (b) examining the scatter plots of original and bias corrected data. Both the approaches are not perfect since in (a) errors due to the segmentation algorithm creeps in. The approach in (b) is a global measure and needs visual inspection.

FIG. 24 shows the PNCC ordering. As expected the bias field fitting method performs better than the unsharp masking based method. Computation time was 0.11 seconds.

Example 10

Motion Correction

It is difficult to keep a subject still during the sufficiently long period of MR image acquisition. Hence prospective or retrospective motion correction schemes are employed to correct the motion artifacts. If there is one place where the dominance of phase images can be practically appreciated, it is in motion correction. It's been a practice of the MR acquisition community to convert the complex k-space data into magnitude image and discard the phase component which carries information about possible motion. Constraint-free prospective phase retrieval from magnitude-only images has been a local-minima infested optimization exercise on very high dimensional space. Hence even within the same algorithm it is hard to decide when to terminate the optimization process and which iterative result to use as the right solution.

Figure 25:
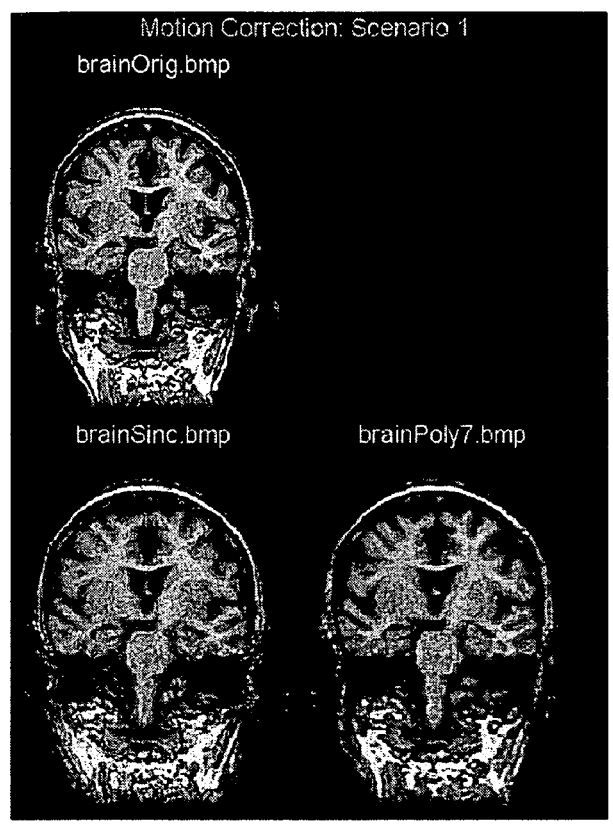
FIG. 25 is an illustration of test images used in connection with Example 10.

The results from the article Yi Su, Manduca A., et al, "Full 3D Rigid Body Automatic Motion Correction of MRI Images" MICCI 12001: 1326-1327, 2001, were used to test the invention in this example. In this article a motion-free MR brain (FIG. 25 a) image was corrupted with motion artifacts and the resulting image (FIG. 27 a) was autocorrected to fix motion artifacts. During the auto correction process, the authors used sinc and polynomial-based interpolation. The results (FIG. 27b,c) obtained from these interpolants were used as competing results. Rating was done on both the original image and the corrupted image. The ordering flag was set to "descending" and "ascending" respectively when rating the competing results against the original and motion corrupted input data.

Figure 26:
FIG. 26 is an illustration of images rated in accordance with the present invention in Example 10.
Figure 27:
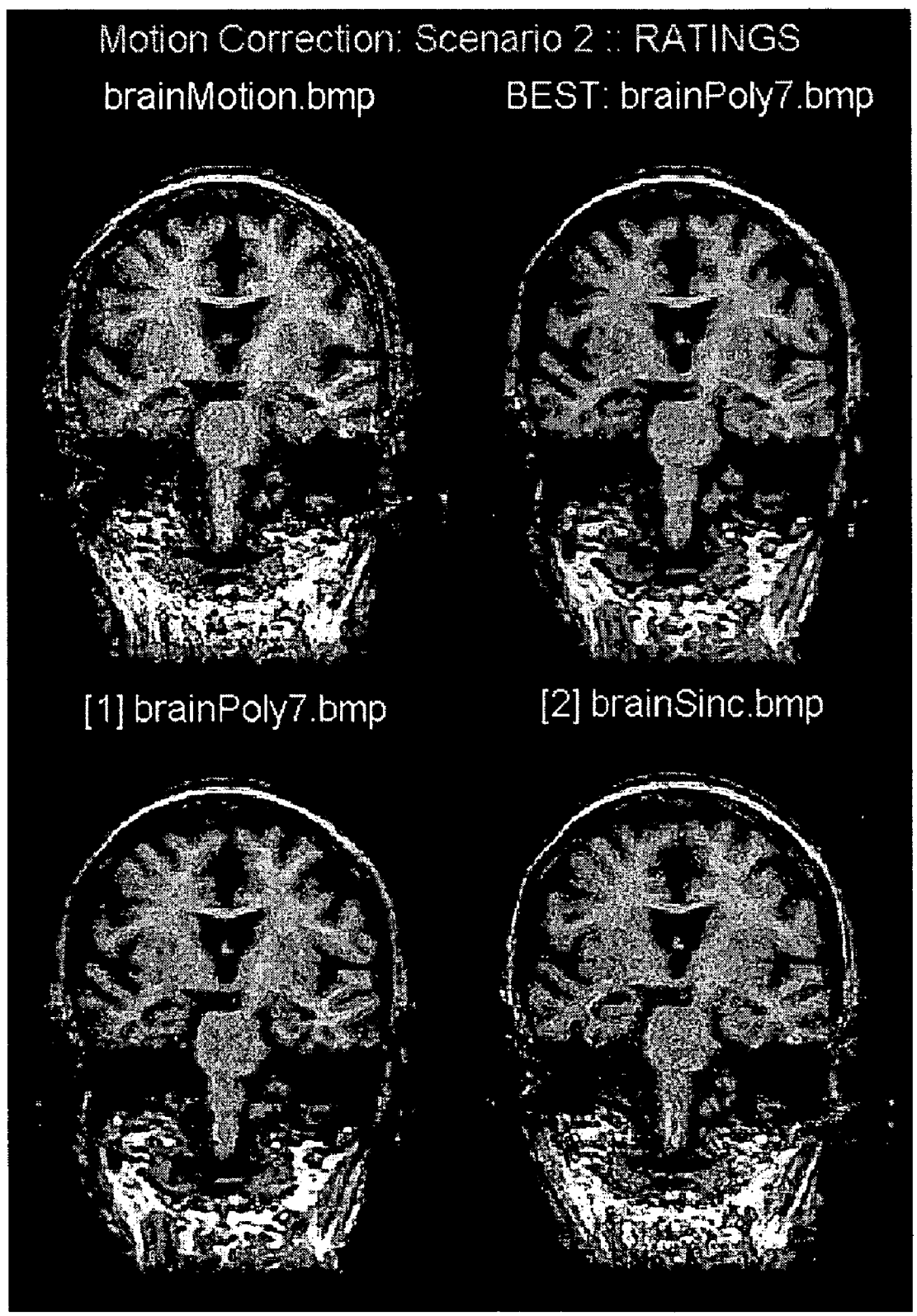
FIG. 27 is an illustration of images showing competing motion correction results against corrupted input data in connection with Example 10.

The article authors described the results qualitatively based on visual examination. They claimed that their higher order polynomial interpolation performed better than the sinc counterpart. FIGS. 26 and 27 gives the result of our quantitative PNCC measure. In both the cases, the polynomial interpolation outperformed the sinc interpolation. Combined computation time was 0.281 secs.

Example 11

Multispectral Classification

The goal of unsupervised multispectral classification is to precisely identify objects in a scene by incorporating the complementary information available in spatially registered multispectral images. It allows the automatic identification of spectral clusters without prior knowledge to generate multispectral signatures of classes in feature space. These classifiers are controlled by predetermined clustering characteristics expected in the data. ISODATA classifier is one of the many popular multispectral classifiers. In this method, the user specifies the number of expected classes and the starting centroids are automatically and arbitrarily set so as to cover a broad range of feature space. Each voxel is classified to the class whose centroid is closest to the voxel in feature space. Depending on how the starting centroids are distributed the result of the classifier would be different. Usually, the classifier is run a number of times and the best result is chosen by visual inspection.

Figure 28:
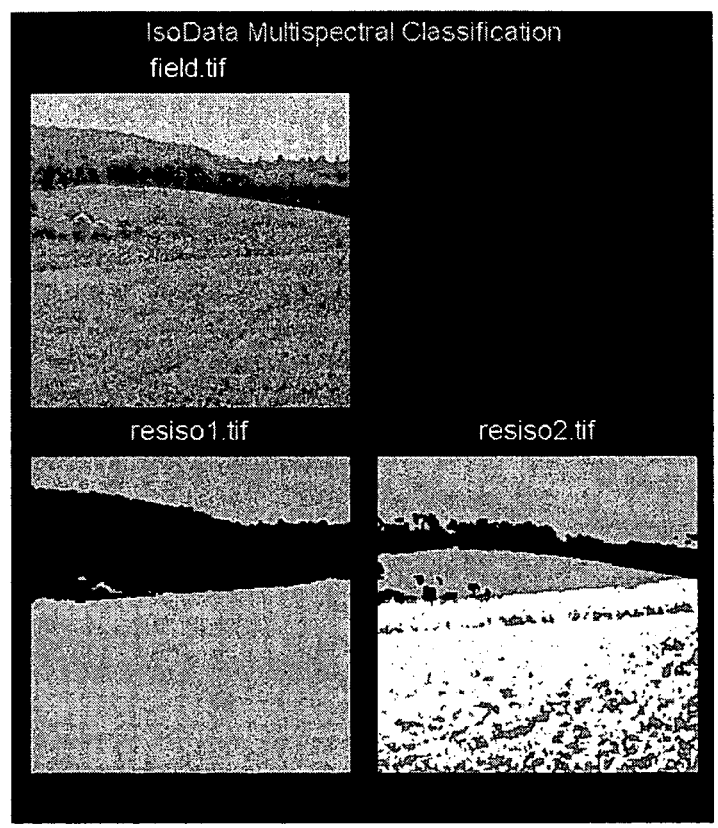
FIG. 28 is an illustration of test images used in connection with Example 11.

In this example the field color (FIG. 28 a) image supplied with the Analyze tutorial datasets was used. Two different ISODATA classifications (FIG. 28b,c) were used as the competing results. In each of these cases, ISODATA classification was followed by mode filtering to remove stray misclassifications. Ordering flag was set to "descending".

Figure 29:
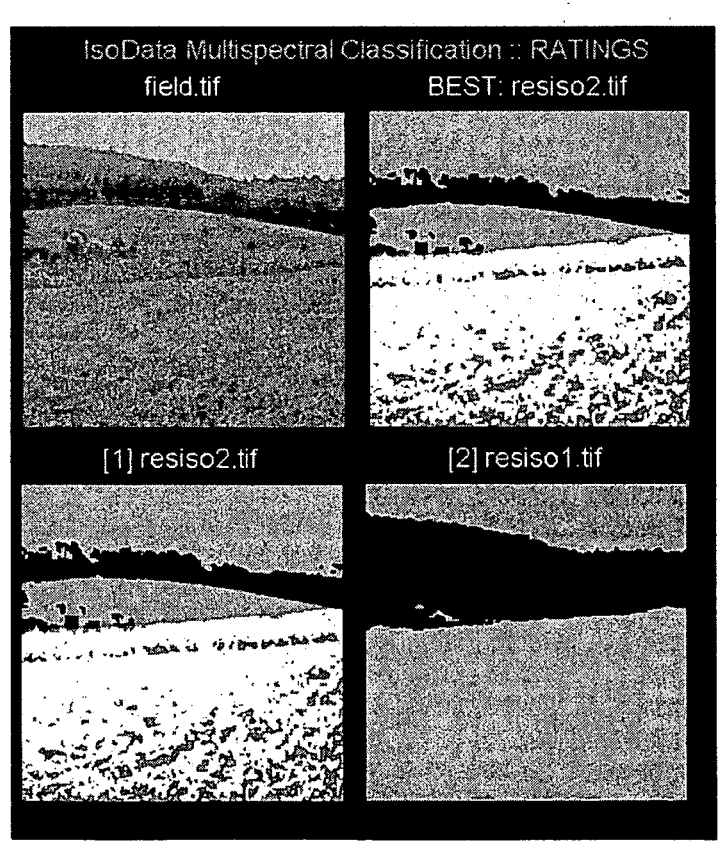
FIG. 29 is an illustration of images rated in accordance with the invention in Example 11.
Figure 30:
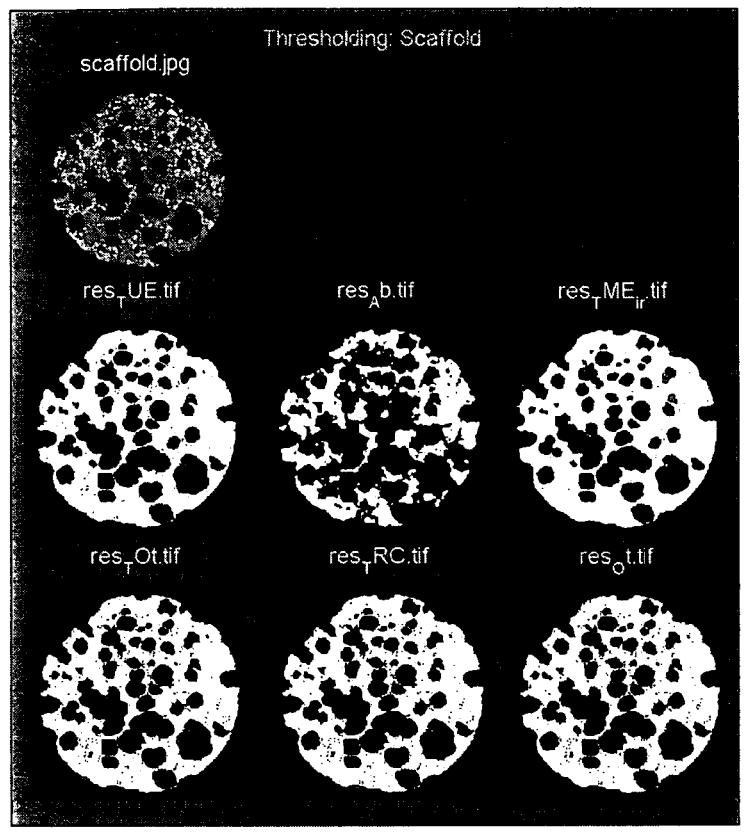
FIG. 30 is an illustration of test images used in connection with Example 12.

Decision-making is based on visual inspection for this example. FIG. 29 shows the PNCC ordering. Validity of this rating visually evident. Computation time was 0.875 seconds. The PNCC rating can also be used to rate the best result produced by an algorithm which attempts to minimize/maximize a cost function by repeatedly running the algorithm by randomly choosing the seed points or positions. Such a situation exists in many tasks such as segmentation, registration and image matching.

Example 12

Thresholding

In many applications of image processing, the gray levels of pixels belonging to the object are distinctly different from the gray levels of pixels belonging to the background. Thresholding then becomes a simple but effective tool to separate objects from the background. Suffice to say that the need for thresholding is universal. The main difficulty associated with thresholding occur when the associated noise process is non-stationary, correlated and non-gaussian. In addition ambient illumination, variance of gray levels within the object and the background, inadequate contrast, and the lack of objective measures to assess the performance of a number of different thresholding algorithms also limit the reliability of an automatic thresholding algorithm.

MicroCT acquisitions of a polymeric scaffold (FIG. 30a) was used as the input data. The thresholding algorithms that exploit spatial information, locally adaptive characteristics, histogram entropy information, histogram shape information, and clustering of gray-level information were used to produce the competing results (FIG. 30b-g). The ordering flag was set to "descending".

Figure 31:
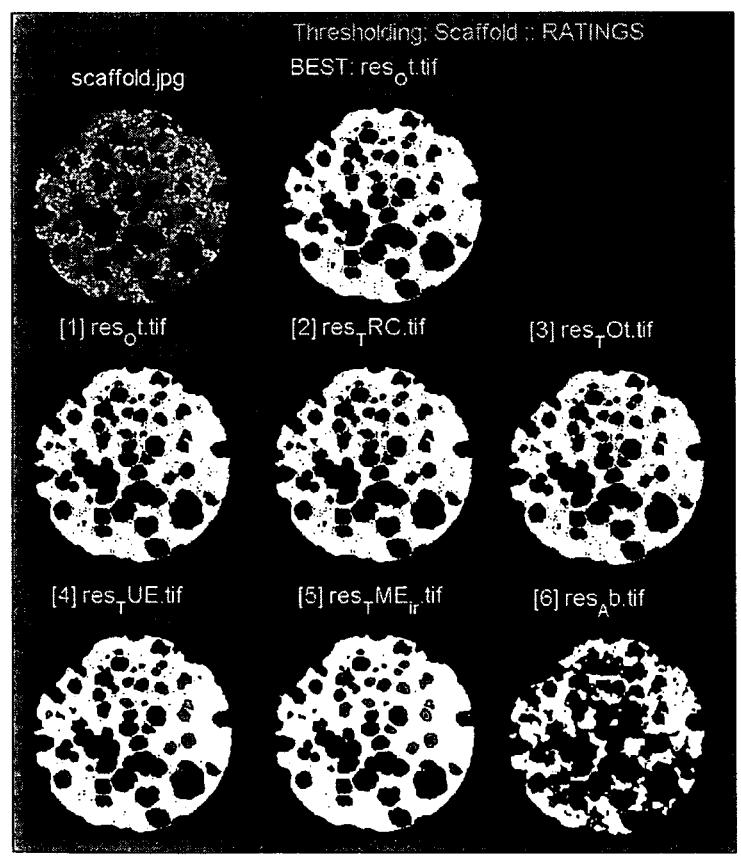
FIG. 31 is an illustration of images rated in accordance with the present invention in Example 12.

In the article Srinivasan R. Yaszemski M. J, Robb R. A., "Evaluation of Thresholding Techniques for Segmenting Scaffold Images In Tissue Engineering" to appear Medical Imaging 2004, the performance of different techniques were evaluated using established criteria like misclassification error, edge mismatch, relative foreground error, and region non-uniformity. This approach requires the availability of ground truth which is difficult to obtain for stochastic structures like polymeric scaffolds. FIG. 31 shows the PNCC ratings. Computation time was 1.218 seconds. The results are consistent with those obtained in the Srinivasan et al. article.

Example 13

Image Segmentation

Image segmentation—the process of defining objects in images is a backbone to any application that uses image processing. In spite of nearly four decades of research, segmentation remains a challenging problem in image processing and computer vision. Lack of methodological approach to evaluate segmentation methods has been one of the reasons hindering the advances in segmentation.

Figure 32:
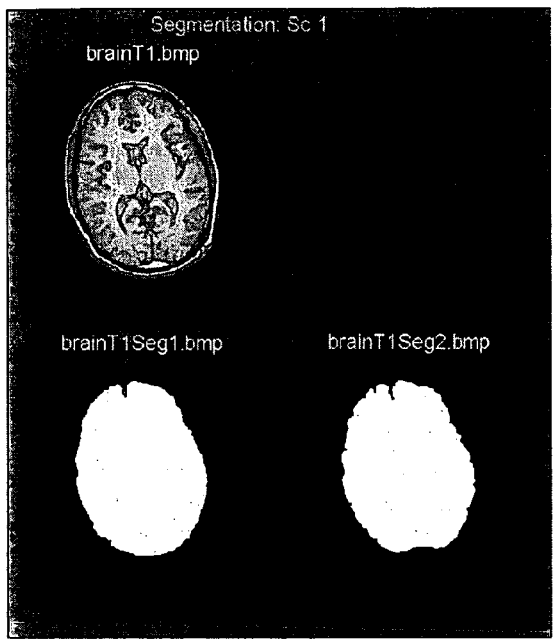
FIG. 32 is an illustration of test images used in connection with Example 13.
Figure 33:
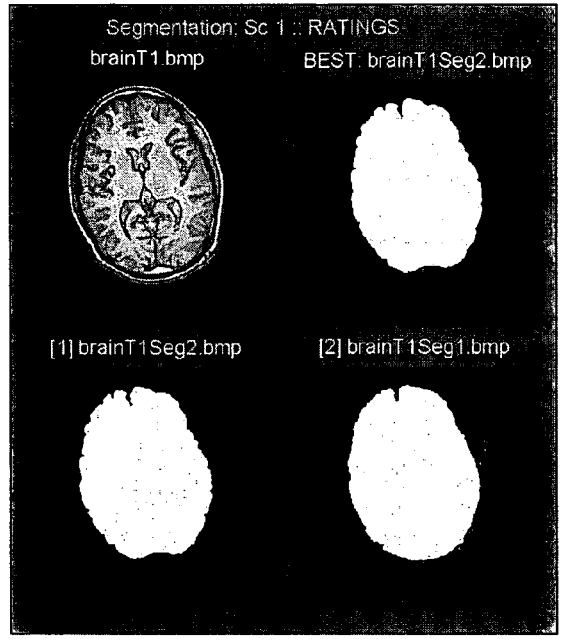
FIG. 33 is an illustration of images rated in accordance with the present invention in Example 13.
Figure 34:
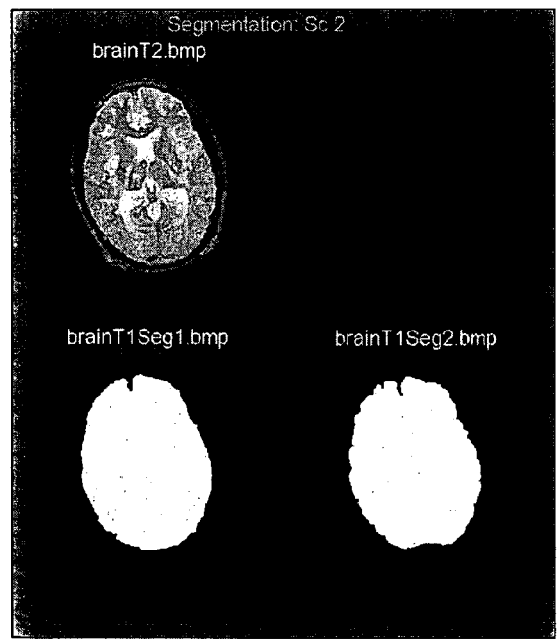
FIG. 34 is an illustration of test images used in connection with Example 13.
Figure 35:
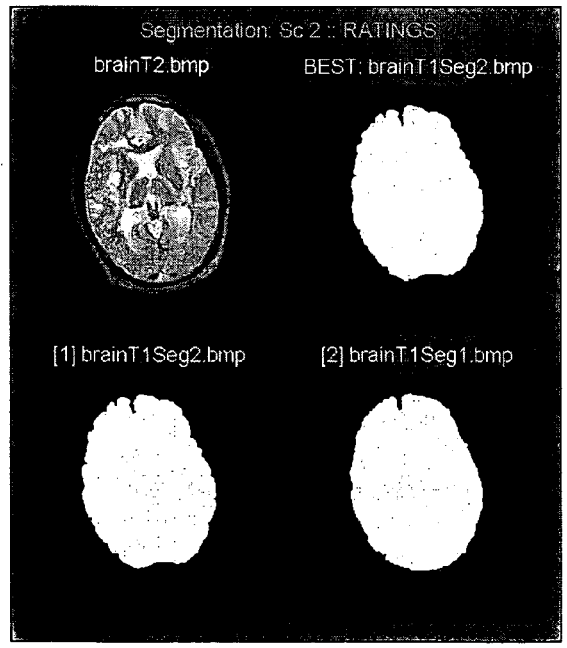
FIG. 35 is an illustration of images rated in accordance with the present invention in Example 13.
Figure 36:
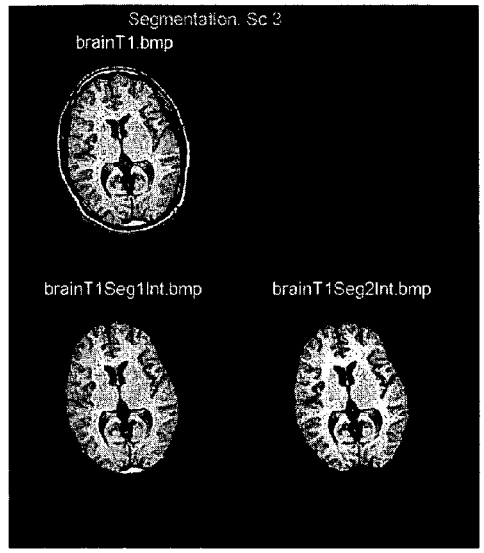
FIG. 36 is an illustration of test images used in connection with Example 13.
Figure 37:
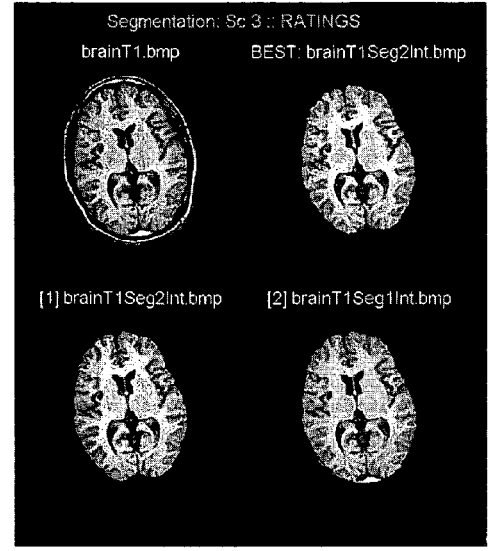
FIG. 37 is an illustration of images rated in accordance with the present invention in Example 13.
Figure 38:
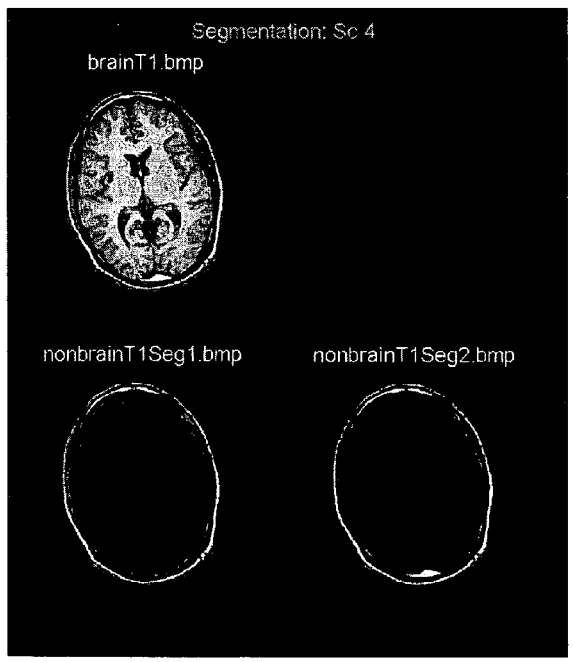
FIG. 38 is an illustration of test images used in connection with Example 13.
Figure 39:
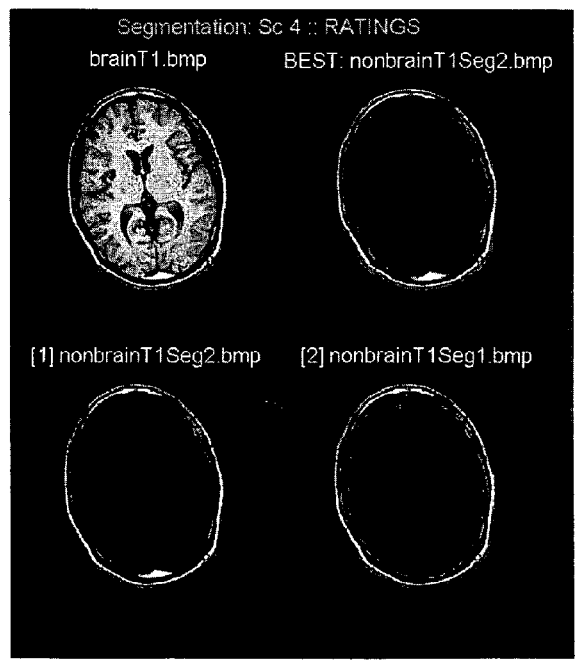
FIG. 39 is an illustration of images rated in accordance with the present invention in Example 13.

An image from a T1 weighted MR brain scan was used as the input data (FIG. 32a). Two different approaches (live wire and region growing) to segment the brain from the skull were used to generate the competing results. Furthermore, since a T2 weighted, perfectly registered brain image was available for the input data, the results were rated against that also (FIG. 34). Since the competing results were just binary masks, we used this to mask the input data and rate the resulting brain-only sections (FIG. 36). Finally, we took the inverse mask of the brain-only region to get the non-brain regions, masked it against the T1 input data to get competing non-brain results (FIG. 38). In all the above cases, the ordering flag was set to "descending".

There are a number of survey papers on image segmentation but there is hardly a good source of information addressing the issue of validation of the segmentation algorithms. Notable exceptions to this is Valmet and Metric descriptions. Guido Gerig, Matthieu Jomier, Miranda Chakos. "Valmet: a new validation tool for assessing and improving 3D object segmentation", *Proc. MICCAI* 2001, 2208:516-528. Udupa J. K. et al, "A methodology for Evaluating Image Segmentation Algorithms" *In Proc. SPIE,* 4684:266-277, 2002. Valmet is an interactive environment to overlay multiple segmentation results and evaluate the individual raters based on visual appearance, distance metrics, intra-class correlation of object volumes etc. The metric descriptors of Udupa is just a collation of what researchers do currently in isolation. Both these methods have severe limitations. They both are dependent on the availability of ground truth. Their approach seems to give an impression that segmentation is an end by itself. While segmentation is an important step, it is only a means and not an end. As such, it is not practical to expect the user to have knowledge about intermediate ground truths etc. Moreover, Valmet is a cumbersome tool and the information in the Metric article could open new debates on how to weigh the different metrics to get a single value.

FIGS. 33, 35,37, and 39 show the results from PNCC ratings. It shows that the rating gives consistent result irrespective of whether the given competing results are binary or grayscale abstractions of the input data. The total time to compute ratings for all the four tasks was 1.312 seconds.

Example 14

Image Skeletonization

Skeletonization is the process of peeling off of a pattern as many pixels as possible without affecting the general shape of the pattern. In other words, after pixels have been peeled off, the pattern should still be recognized. The skeleton hence obtained should be centered, connected and as thin as possible. Skeletonization also known as central lines, medial axis etc. is used as a shape descriptor and finds immense use in interventional navigation applications. The invertibility of skeletonization to the parent object is one of the important criteria for estimating the robustness of the skeletonization algorithm.

Figure 40:
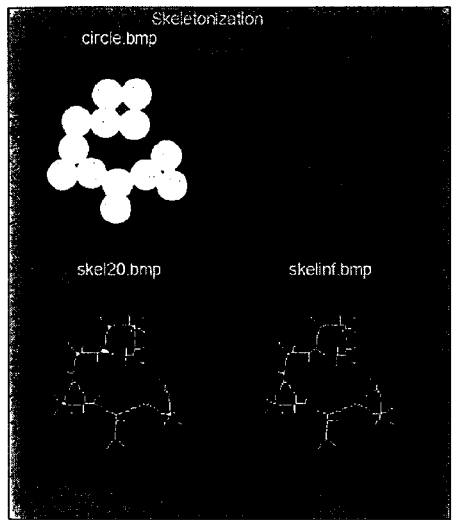
FIG. 40 is an illustration of test images used in connection with Example 14.
Figure 41:
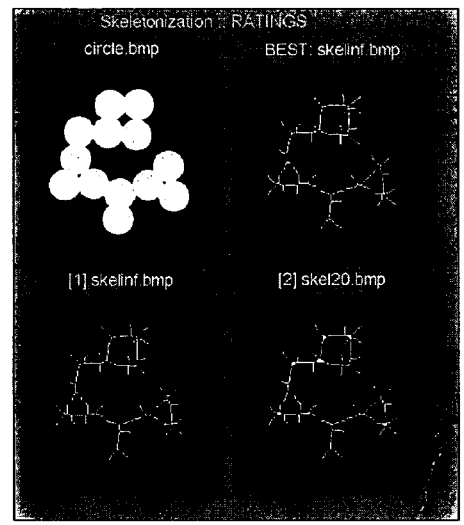
FIG. 41 is an illustration of images rated in accordance with the present invention in Example 14.

The Matlab bwdist command was used to create skeletons of an input image (FIG. 40*a*). This command uses an iterative morphological erosion operation to create the skeletons. Depending on the number of iterative steps used, the skeletons would be different. The example used 20 steps and infinite number of steps (which iterates until the root signal is obtained) to create the competing results (FIG. 40*b,c*). The ordering flag was set to "descending". There is no known way to quantitatively characterize a skeleton. Correctness is determined by visually comparing the original image and its skeleton. FIG. 41 shows the PNCC rating. It agrees well with the visual inspection. Computation time was 0.328 seconds.

Example 15

Radioactive Seed Localization In Fluoroscopy

Image guided dose delivery to the prostate can be done with the help of fluoroscopic imaging. The radioactive seeds are visible in these images. With image processing techniques, the spatial location of the seeds can be reconstructed automatically and then registered with the prostate anatomy. The accuracy of the seed location depends on the ability to segment out the radioactive seeds.

Figure 42:
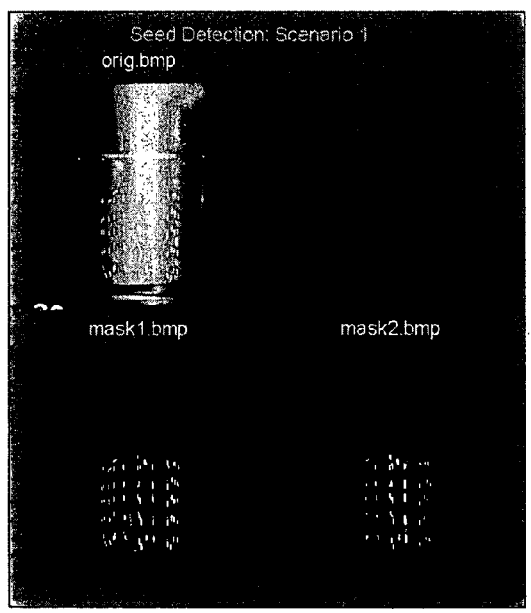
FIG. 42 is an illustration of test images used in connection with Example 15.
Figure 44:
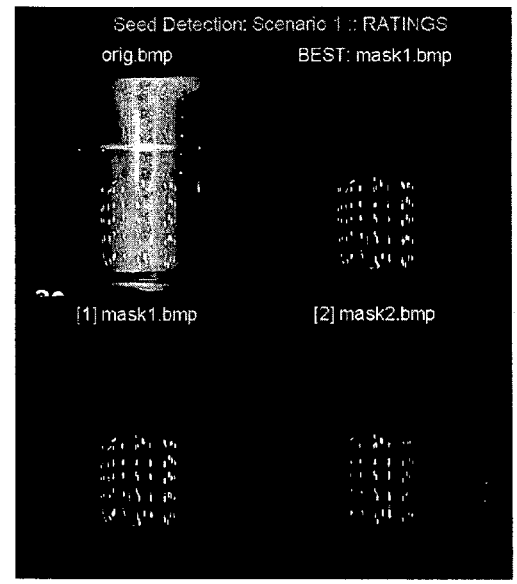
FIG. 44 is an illustration of images rated in accordance with the present invention in Example 15.
Figure 46:
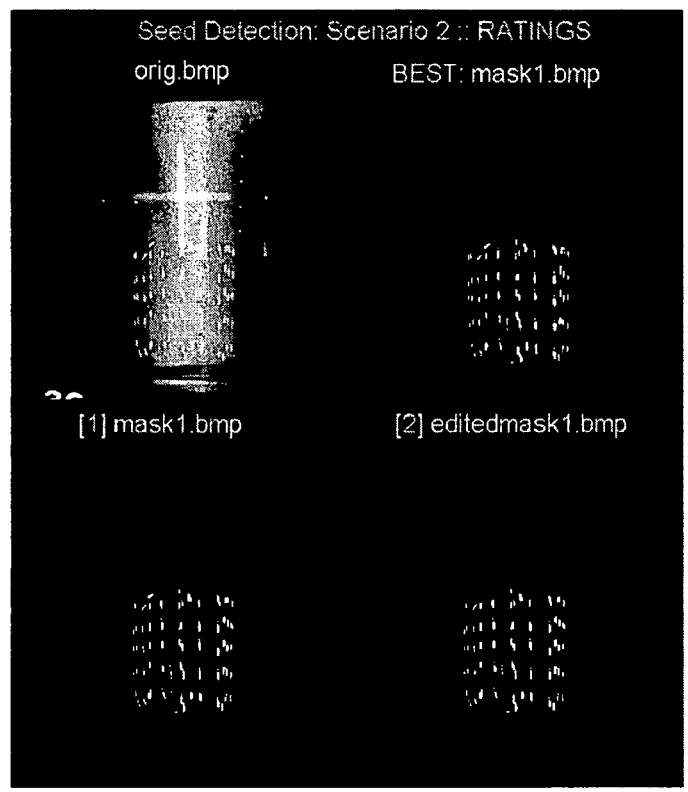
FIG. 46 is an illustration of images rated in accordance with the present invention in Example 15.

Fluoroscopy images were used as the input data (FIG. 42*a*). We also used associated seed identification results based on different techniques as the competing results (FIG. 42*b,c*). To test the robustness of the rater, a small region of the result which the rater voted as the best was edited and the resulting image was rated with the unedited result (FIG. 44). Ordering flag was set to "descending" for both the cases.

Figure 43:
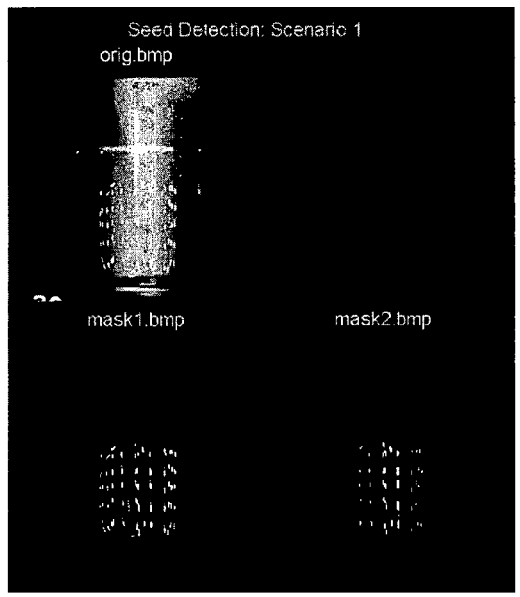
FIG. 43 is an illustration of test images used in connection with Example 15.
Figure 45:
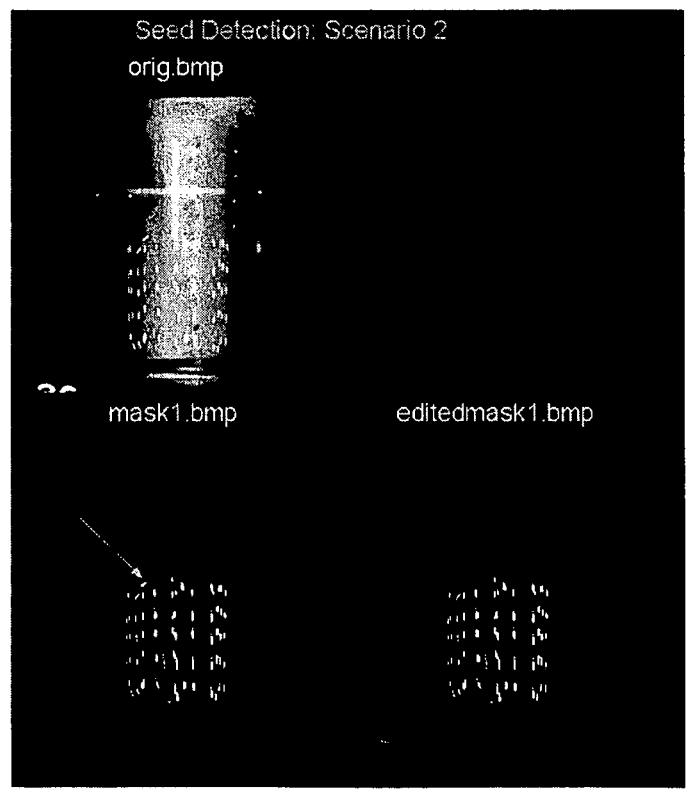
FIG. 45 is an illustration of test images used in connection with Example 15.

Current rating is based on visual inspection. The PNCC based orderings are given in FIGS. 43 and 45. The results agree with the visual inspection. Combined computation time was 1.4 seconds.

Example 16

Compression

In general, the Space-time product seems to be a constant. That is, if time is reduced, space is increased and vice versa. The same is true with image acquisition. As advances are made to reduce the acquisition time, the spatial resolution of the images seems to be increasing. Whole body scans and MicroCT are a good example of this. Though memory hardware is becoming cheaper and cheaper for storage of the associated large datasets, computational overheads with these seem not to follow the Moore's law. Hence there is a need to find lossless and lossy compression schemes which can help to reduce the computational overheads. Moreover, for data communication over the web, reliable compression schemes are required. While compression schemes are quantitatively evaluated for the reduction in memory usage, the quality of lossy compression is typically specified by qualitative visual inspection. Quantitative metrics could possibly help improve the reliability of many compression schemes.

Figure 47:
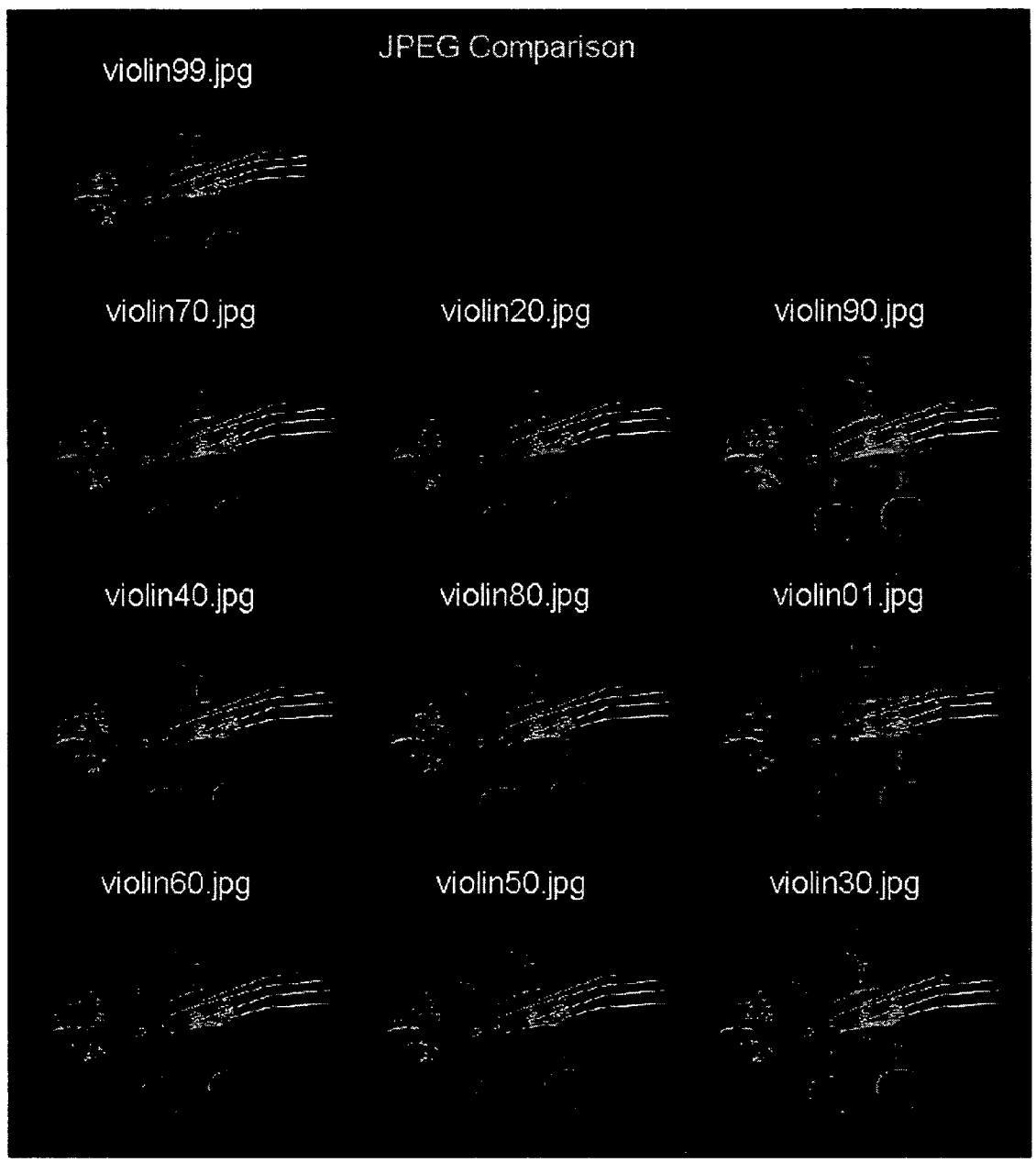
FIG. 47 is an illustration of test images used in connection with Example 16.

The example included rating the JPEG compression at different quality settings. Violin images available at http://www.dsdesign.com/articles/violin.htm were used. In the absence of the original tiff image, the image with the highest JPEG quality was used as the input image (FIG. 47*a*). The jpeg images at quality levels 90, 80, 70, 60, 50, 40, 30, 20, and 1 were used as competing results (FIG. 47*b-j*). The ordering flag was set to "descending".

Figure 48:
FIG. 48 is an illustration of images rated in accordance with the present invention in Example 16.
Figure 49:
FIG. 49 is an illustration of images rated in accordance with the present invention in Example 16.

Image quality rating for compressed images is predominantly done by visual inspection. FIG. 48 shows the results from the PNCC ordering. As generally expected, the image quality deteriorated in accordance with the quality factor. Computation time was 2.7 seconds. To further test the best possible JPEG compressions provided by different programs, the box data provided at http://imagecompress.com/comparison.htm was used. The original Photoshop file was used as the input data and the 19 datasets from different applications as the competing results. The results from the ratings in shown in FIG. 49. Computation time was 10.2 seconds.

Example 17

3D Brain Segmentation

Figure 50:
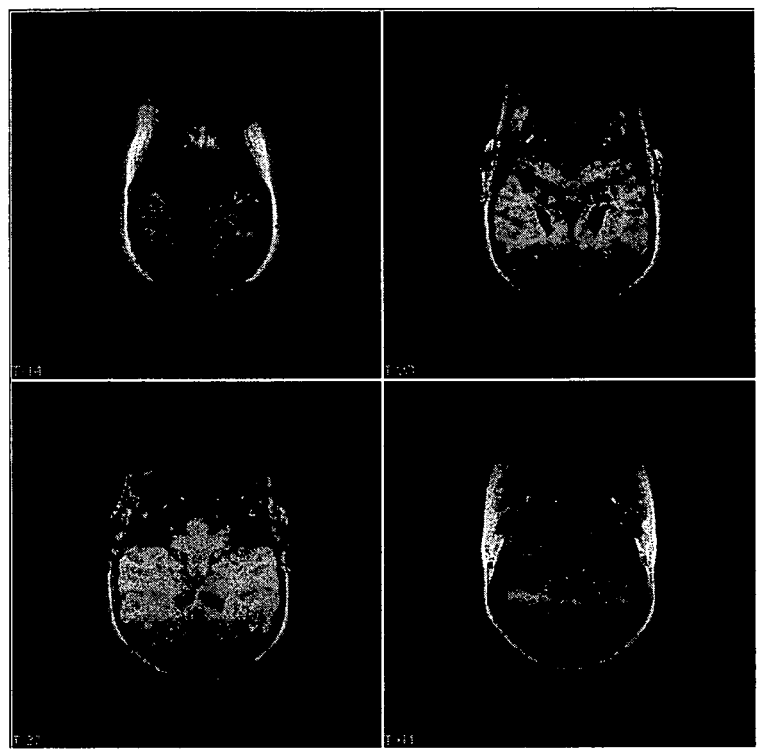
FIG. 50 is an illustration of test images used in connection with Example 17.
Figure 51:
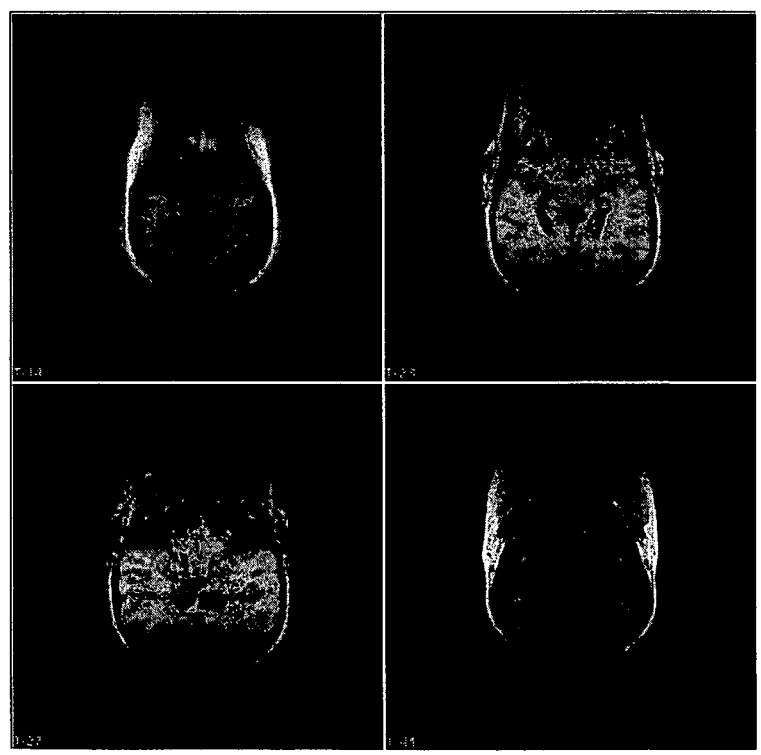
FIG. 51 is an illustration of test images used in connection with Example 17.

The rating of 3D brain segmentation algorithms was explored to show the possibility of extending the PNCC ratings to higher dimensions. MRI brain dataset from the MGH IBSR database (http://www.cma.mgh.harvard.edu/ibsr/) was used an input data (Candidate slices are shown in FIG. 50). Manual segmentations of the brain-only regions (provided by MGH) and the brain-only segmentations produced by using the watershed transformations available in Analyze were used as the candidate slices (FIG. 51). Ordering flag was set to "descending". Three Dimensional version of the rater (essentially the same except for using multi dimensional fft and the Analyze interface to display the results) was used to rate the two results.

As mentioned before, existing validations for segmentation are dependent on the availability of ground or surrogate truth. The PNCC rating showed that the result produced by Analyze is a good representation of the segmentation derived from the master input data. However, by inspection of the candidate slices, it is clear that the manual method is a much better segmentation. On further examination, it seems that, in spite of the meninges surrounding the brain, the Analyze segmentation is better since it retained the brain-stem which is very much part of the brain. In the manual method, the brain stem was explicitly cut off and so was a poorer representation of the whole brain. This is the basis for the assumption that the algorithms should compete in a "scratch race" adhering to the same rules.

Figure 52A:
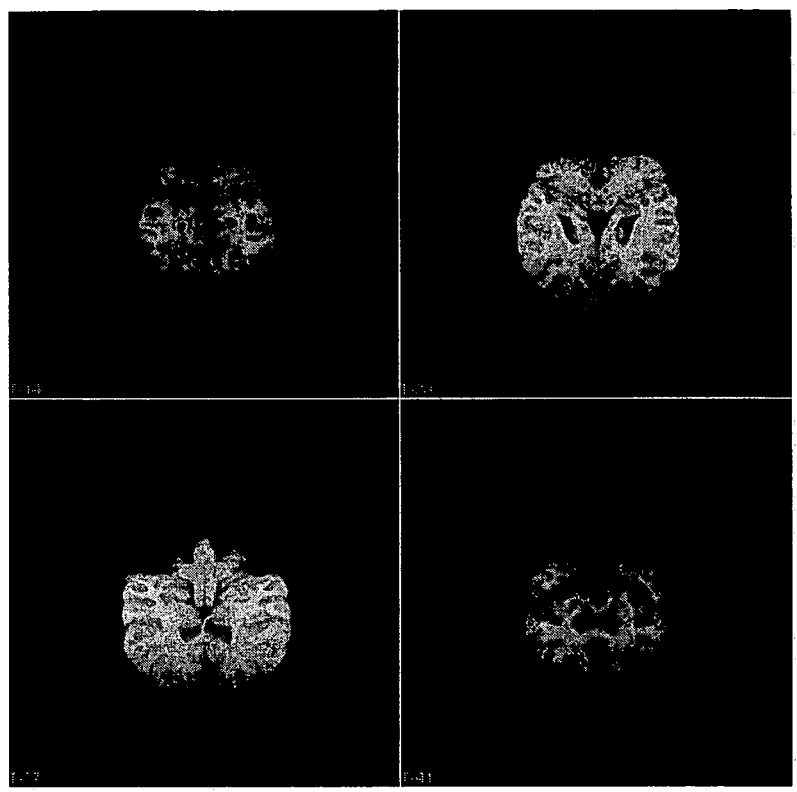
FIG. 52A is an illustration of images shown in FIG. 51 with portions of the brain stem removed.
Figure 52B:
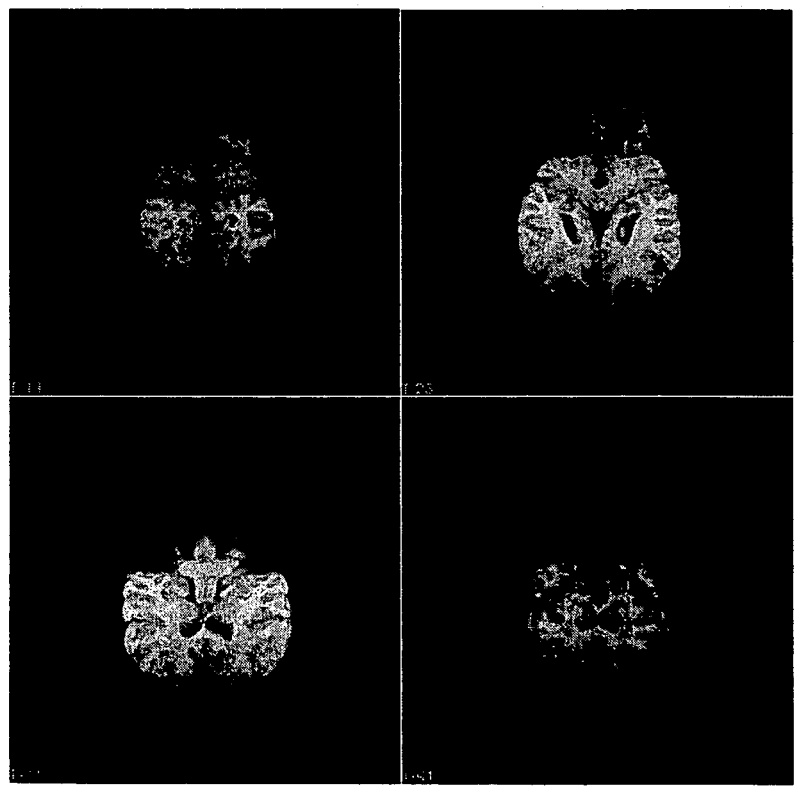
FIG. 52B is an illustration of images rated in accordance with the present invention in Example 17.
Figure 53:
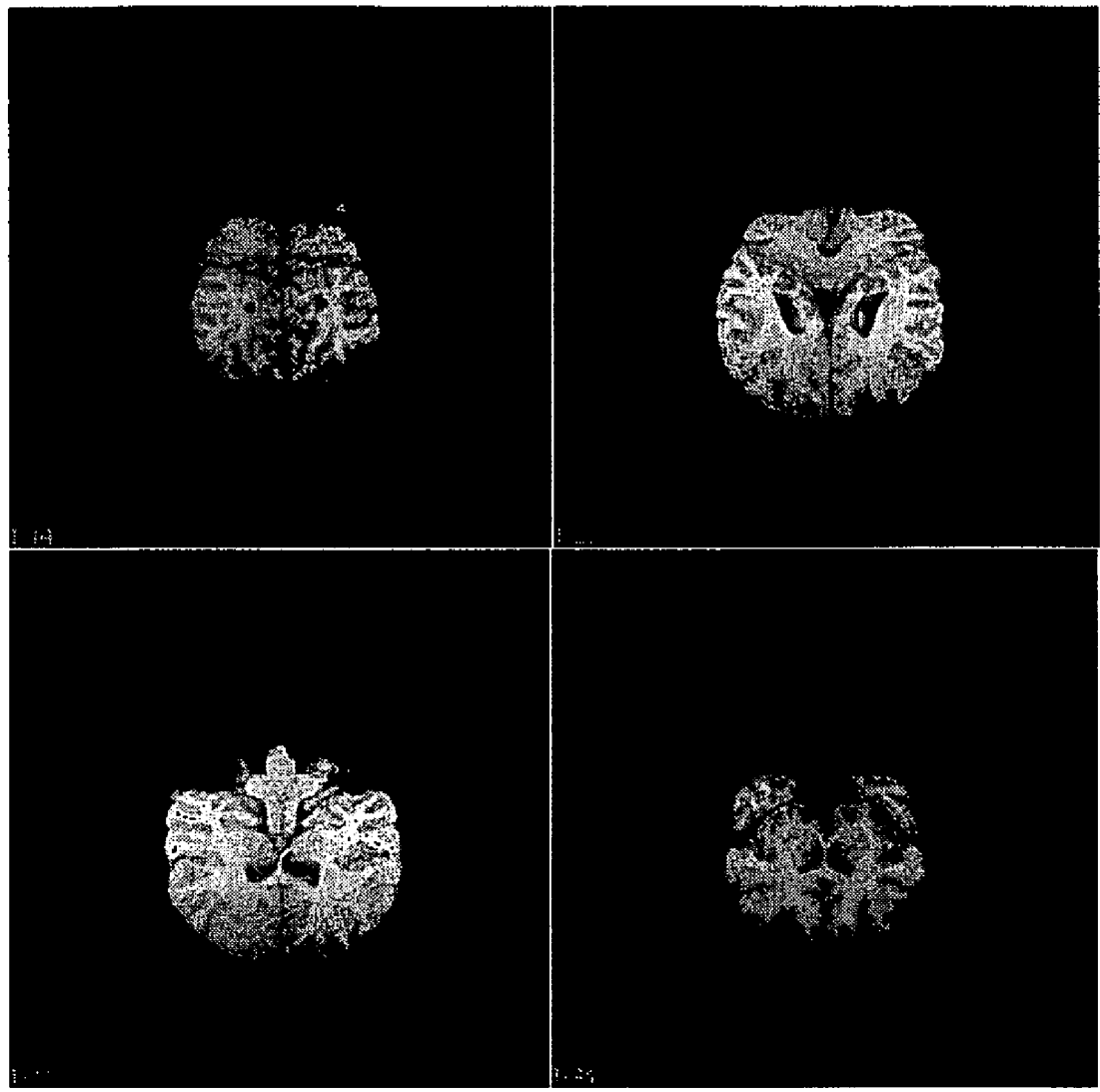
FIG. 53 is an illustration of images of watershed results following the limiting of the brain stem.

To address this, the Analyze segmentations were manually limited to remove the brain stem. Resultant candidate slices are shown in FIG. 52A. This result was rated against the manual segmentations. FIG. 52B illustrates the results of watershed based brain segmentation for candidate slices of the input data. FIG. 53 shows the watershed results after limiting the brainstorm. The resulting PNCC rating showed that manual segmentation was better than the automatic watershed based segmentation. Total computation time for both the ratings was 22 seconds.

CONCLUSIONS

The invention is a robust, automatic, fast, intuitive, and consistent metric to rate competing algorithms that take in the same input data and produce same or different results depending on their characteristic response to the given data. To remove any bias, the metric is blind about the task associated with the generation of competing results. This allows the same rating mechanism to be used for all possible tasks within an application. By not making use of the not-so-easily-available ground truth, the approach does not alter the existing level of automation in the application. While not restricted to just validating and rating task and subtask level algorithms, its computational efficiency enables its use for micro validation. In all examples we found that the rating was much faster than the time taken by any single competing algorithm. The versatility of the PNCC measure was demonstrated by its discriminatory and rating power across the following applications:

1. disciplines (signal processing, signal synthesis, image acquisition, image processing and image coding).
2. dimensions (1D, 2D, and 3D), across data types (vector, scalar, real, complex).
3. channels (binary, grayscale, pseudo color, rgb, monospectral—>multispectral)
4. imaging modalities (computer generated, photographs, CT, microCT, Fluoroscopy, MRI)
5. feature enhancements, including
   a. Shapes (shape-based interpolation, motion correction)
   b. Intensity (deconvolution, intensity interpolation, smoothing, contrast enhancement, inhomogeneity correction)
6. levels of abstractions (pixel classification—>central line extraction)
7. tasks (image reconstruction, image segmentation, compression)

The invention does not undermine the use or significance of existing application level validation. Instead, it provides some credibility to it.

The method of the invention can, for example, be used in connection with one or more of the following applications:

(1) data enhancement (including, denoising, smoothing, contrast/spectrum maximization, artifact (motion, inhomogeneity) correction, interpolation (intensity, shape, spatial/temporal), (2) data abstraction (including, reconstruction, restoration, deblurring, classification, segmentation, detection, skeletonization (summarization), (3) data projection: (i) spatially (including, registration, multiresolution zooming, data collapse as in volume/surface rendering), (ii) temporally (including, time warping), (iii) entropically (including, compression as in image (TIFF, JPEG, BMP, GIF), video (MPEG, AVI, Realmedia), audio (mp3, realaudio etc.), data (quadtree, octree, DCT, Fourier descriptors, wavelets), or (4) data protection (watermarking, encryption etc.).

The validity rating method described herein can be performed by a programmed computer or data processing system. Instructions for performing the method can be stored on computer-readable media and executed by the computer or data processing system.

Although the present invention has been described with reference to preferred embodiments, those skilled in the art will recognize that changes can be made in form and detail without departing from the spirit and scope of the invention. In particular, although the examples are generally in the field of medical image processing, the claims are not so limited, and as described in the specification, the invention can be applied to any of a wide range of applications.

What is claimed is:

1. A method to operate a computing machine to rate the validity of a data processing algorithm A on input data I, wherein the input data is processed by the data processing algorithm to produce output data P, the method including:

generating one or both of phase representations and phase congruence representations of the input data, including: (1) computing an n Dimensional Fourier Transform or discrete cosine transform of the input data, and (2) computing the phase of the transform computed at (1); and generating one or both of phase representations and phase congruence representations of the output data, including: (3) computing an n Dimensional Fourier Transform or discrete cosine transform of the output data, and (4) computing the phase of the transform computed at (3);

generating a similarity metric of one or both of the generated phase representations and phase congruence representations of the input data with one or both of the generated phase representations and phase congruence representations of the output data, including (5) computing the normalized cross correlation mean absolute phase difference (MAPD), normalized mean square error (NMSE) or scale invariant normalized mean square error (S1NMSE) of the input data transform phase computed at (2) with the output data transform phase computed at (4); and wherein the generated similarity metric is a value representative of the validity of the data processing algorithm and is free from use of a ground truth.

2. A computing machine having computer-readable media encoded with executable instructions to perform the method of claim 1.

3. Computer-readable media encoded with executable instructions to perform the method of claim 1.

4. The method of claim 1 in connection with any one or more of the following applications:

(1) data enhancement, artifact correction, interpolation, (2) data abstraction, (3) data projection, or (4) data protection.

5. The method of claim 1 in connection with any one or more of the following applications: one dimensional signal denoising, magnetic resonance image acquisition, projection reconstruction techniques, restoration-blind deconvolution, image contrast enhancement, image smoothing, intensity interpolation, shape based interpolation, inhomogeneity correction, motion correction, multispectral classification, thresholding, image segmentation, image skeletonization, radioactive seed localization in fluoroscopy, compression, brain and segmentation.

6. A method to operate a computing machine to rank the validity of a plurality (n) of data processing algorithms $A_1$-$A_n$ on input data I, wherein the input data is processed by each of the data processing algorithms to produce associated output data $P_1$-$P_n$, the method including:

generating one or both of phase representations and phase congruence representations of the input data, including: (1) computing an n Dimensional Fourier Transform or discrete cosine transform of the input data, and (2) computing the phase of the transform computed at (1);

generating one or both of phase representations and phase congruence representations of the associated output data for each of the plurality of data processing algorithms, including: (3) computing an n Dimensional Fourier Transform or discrete cosine transform of the associated output data for each of the plurality of data processing algorithms, and (4) computing the phases of the transforms computed at (3);

generating a similarity metric of one or both of the generated phase representations and phase congruence representations of the input data with one or both of the generated phase representations and phase congruence representations of the associated output data for each of the plurality of data processing algorithms, including (5) computing the normalized cross correlation (NCC), mean absolute phase difference (MAPD), normalized mean square error (NMSE) or scale invariant normalized mean square error (S1NMSE) of the input data transform phase computed at (2) with the output data transform phase computed at (4) for each of the data processing algorithms; and ordering the generated similarity metrics, wherein the order of the similarity metrics is a ranking of the validity of the data processing algorithms and is free from use of a ground truth.

7. A computing machine having computer-readable media encoded with executable instructions to perform the method of claim 6.

8. Computer-readable media encoded with executable instructions to perform the method of claim 6.

9. The method of claim 6 in connection with any one or more of the following applications:
   (1) data enhancement, artifact correction, interpolation,
   (2) data abstraction,
   (3) data projection, or
   (4) data protection.

10. The method of claim 6 in connection with any one or more of the following applications: one dimensional signal denoising, magnetic resonance image acquisition, projection reconstruction techniques, restoration-blind deconvolution, image contrast enhancement, image smoothing, intensity interpolation, shape based interpolation, inhomogeneity correction, motion correction, multispectral classification, thresholding, image segmentation, image skeletonization, radioactive seed localization in fluoroscopy, compression, brain and segmentation.

* * * * *

UNITED STATES PATENT AND TRADEMARK OFFICE
CERTIFICATE OF CORRECTION

PATENT NO. : 8,019,801 B1
APPLICATION NO. : 11/165597
DATED : September 13, 2011
INVENTOR(S) : Richard A. Robb et al.

It is certified that error appears in the above-identified patent and that said Letters Patent is hereby corrected as shown below:

Column 18, line 15, insert --NCC-- after "normalized cross correlation"

Column 18, line 18, change "(S1NMSE)" to --(SINMSE)--

Column 19, line 10, change "(S1NMSE)" to --(SINMSE)--

Signed and Sealed this
Twenty-eighth Day of February, 2012

David J. Kappos
*Director of the United States Patent and Trademark Office*